(12) United States Patent
Kuehn

(10) Patent No.: US 11,969,041 B2
(45) Date of Patent: Apr. 30, 2024

(54) MADE TO MEASURE APPAREL PATTERNMAKING SYSTEM AND METHOD

(71) Applicant: Anne E. Kuehn, Broomfield, CO (US)

(72) Inventor: Anne E. Kuehn, Broomfield, CO (US)

( * ) Notice: Subject to any disclaimer, the term of this patent is extended or adjusted under 35 U.S.C. 154(b) by 87 days.

(21) Appl. No.: 17/879,006

(22) Filed: Aug. 2, 2022

(65) Prior Publication Data

US 2023/0036395 A1   Feb. 2, 2023

Related U.S. Application Data

(60) Provisional application No. 63/228,559, filed on Aug. 2, 2021.

(51) Int. Cl.
*A41H 3/00* (2006.01)

(52) U.S. Cl.
CPC ................. *A41H 3/007* (2013.01)

(58) Field of Classification Search
CPC ......... A41H 3/007; G06F 30/00; G06F 30/12; G06T 17/00; G06T 19/00
USPC ....................................... 700/132
See application file for complete search history.

(56) References Cited

U.S. PATENT DOCUMENTS

| | | | | |
|---|---|---|---|---|
| 4,916,634 A * | 4/1990 | Collins | ................. | A41H 3/007 706/62 |
| 10,366,175 B2 | 7/2019 | Gupta et al. | | |
| 2001/0026272 A1* | 10/2001 | Feld | ................. | A41H 3/007 345/585 |
| 2006/0015208 A1* | 1/2006 | Reyes Moreno | ....... | G06T 13/40 700/132 |
| 2008/0312765 A1 | 12/2008 | Gardiner et al. | | |
| 2009/0222127 A1* | 9/2009 | Lind | ................. | G06Q 30/0601 705/26.1 |
| 2014/0114620 A1* | 4/2014 | Grinspun | ............... | A41H 3/007 703/1 |
| 2015/0351477 A1* | 12/2015 | Stahl | ....................... | G06T 15/04 700/132 |

(Continued)

FOREIGN PATENT DOCUMENTS

JP    2005506620 A    3/2005

OTHER PUBLICATIONS

"Telestia Creator: Pattern Cutting CAD software," etelestia.com. https://www.etelestia.com/en/cad-pattern-cutting-software.aspx [Date accessed: Apr. 19, 2021].

(Continued)

*Primary Examiner* — Nathan E Durham
(74) *Attorney, Agent, or Firm* — Bold IP, PLLC; Houda El-Jarrah

(57) ABSTRACT

An apparel patternmaking software that allows the user to select from a plurality of templates for a variety of slopers that can be used to create a customized, made to measure digital sewing pattern for various articles of clothing. The user is asked to provide measurements that can be manually measured or imported from a body scanner or both. Further, the user is prompted to review a list of default, pre-defined design choices for how to adjust a sloper based on the relationship of the inputted measurements with each other (e.g., if the waist is wider than the hip measurement or if the waist is narrower than the hip measurement). The user is allowed to add new conditions and default design choices to edit and alter the sloper. The sloper is automatically adjusted to accommodate the entered set of measurements.

20 Claims, 31 Drawing Sheets

(56) References Cited

U.S. PATENT DOCUMENTS

2019/0231012 A1 8/2019 Daczewitz et al.

OTHER PUBLICATIONS

"AccuMark Made-to-Measure," gerbertechnology.com. https://www.gerbertechnology.com/pdf/AccuMark_MTM_E.pdf [Date accessed: Apr. 19, 2021].

"Macro-Generator," patternmakerusa.com. https://www.patternmakerusa.com/programs/macro-generator/ [Date accessed: Apr. 19, 2021].

"Best Sewing and Fashion Design Solutions," wildginger.com. https://www.wildginger.com/ [Date accessed: Apr. 19, 2021].

"2D & 3D Integrated Pattern Design Software," Optitex.com. https://optitex.com/products/2d-and-3d-cad-software/ [Date accessed: Apr. 19, 2021].

"Fashion Technology: Design Software and Machinery," tukatech.com. https://tukatech.com/?gclid=CjwKCAjwrZOXBhACEiwA0EoRD5RU0zXR5n3_ztZTONLVHvoWCRvwCCnnR7U5XW8p0DmvPXPpukOKqxoCsL8QAvD_BwE [Date accessed: Apr. 19, 2021].

"TUKACAD Tailor Edition," youtube.com. https://www.youtube.com/watch?v=BoGG5bi5s2w [Date accessed: Apr. 19, 2021].

\* cited by examiner

| Dimension/size | Catalog women's size: 5'5"-5'6.5" (165-169 cm) tall, average bust, average back | | | | | | | | |
|---|---|---|---|---|---|---|---|---|---|
| Closest standard size | 2 | 4 | 6 | 8 | 10 | 12 | 14 | 16 | 18 |
| Est.height | 5'5" (165 cm) | 5'5.5" (166 cm) | 5'6" (168 cm) | 5'6" (168 cm) | 5'6.5" (169 cm) | 5'6.5" (169 cm) | 5'6.5" (169 cm) | 5'6.5" (169 cm) | 5'6.5" (169 cm) |
| Est.weight lb (kg) | 145 (66) | 160 (72.5) | 175 (79) | 190 (86) | 205 (93) | 220 (100) | 235 (106.5) | 250 (113) | 265 (120) |
| Bust | 38 | 40 | 42 | 44 | 46 | 48 | 50 | 52 | 54 |
| Waist | 30 | 32 | 34 | 35.5 | 37.5 | 39.5 | 41.5 | 43.5 | 44.5 |
| Hip | 39 | 41 | 43 | 46 | 48 | 50 | 52 | 54 | 56 |

FIG. 1A
(PRIOR ART)

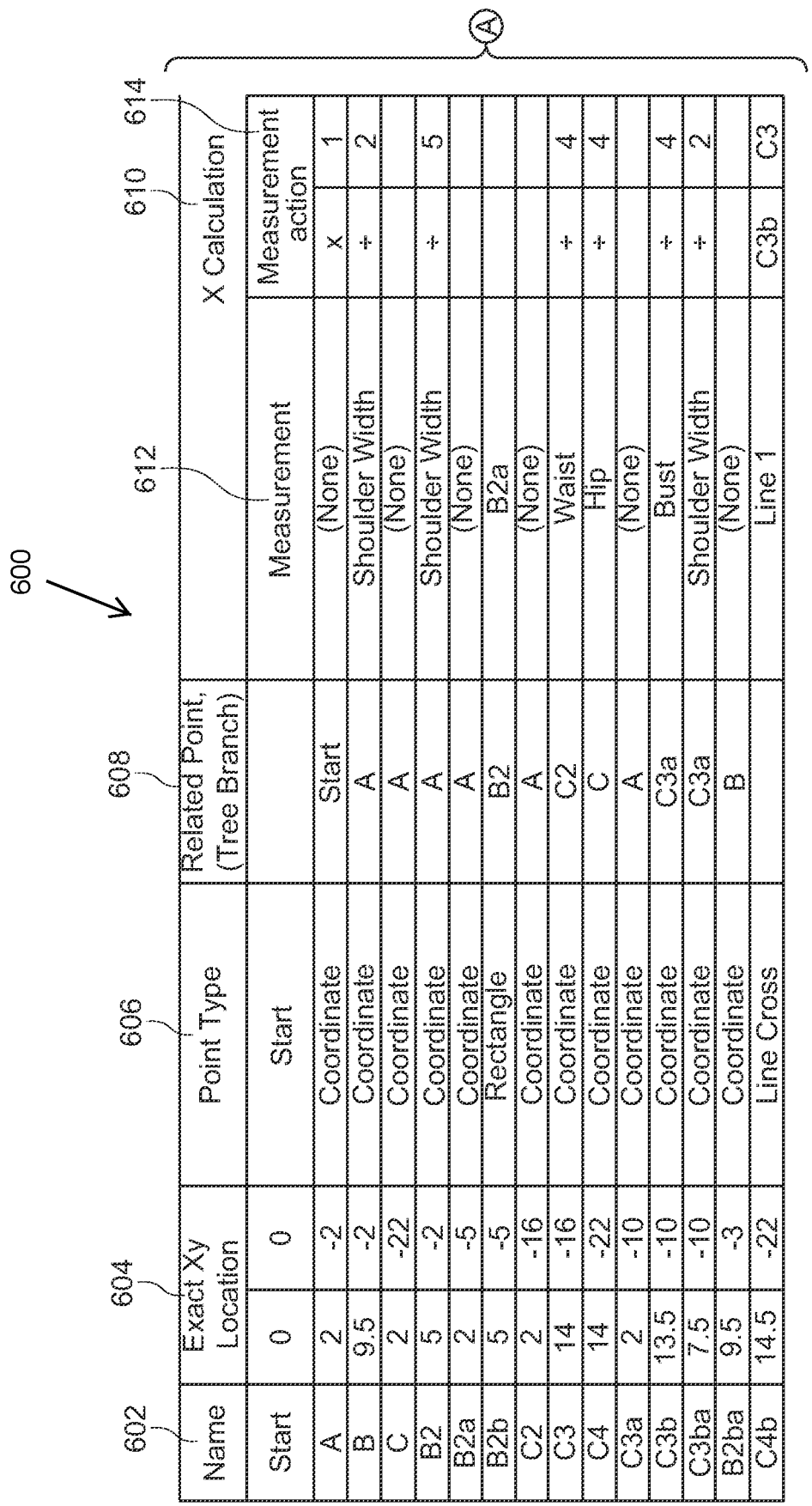

FIG. 6

| Name | Exact Xy Location | | Point Type | Related Point, (Tree Branch) | Measurement | X Calculation | |
|---|---|---|---|---|---|---|---|
| | | | | | Measurement | | Measurement action |
| Start | 0 | 0 | Start | | | | |
| A | 2 | -2 | Coordinate | Start | (None) | × | 1 |
| B | 9.5 | -2 | Coordinate | A | Shoulder Width | ÷ | 2 |
| C | 2 | -22 | Coordinate | A | (None) | | |
| B2 | 5 | -2 | Coordinate | A | Shoulder Width | ÷ | 5 |
| B2a | 2 | -5 | Rectangle | B2 | B2a | | |
| B2b | 5 | -5 | Coordinate | A | (None) | | |
| C2 | 2 | -16 | Coordinate | C2 | Waist | ÷ | 4 |
| C3 | 14 | -16 | Coordinate | C | Hip | ÷ | 4 |
| C4 | 14 | -22 | Coordinate | A | (None) | | |
| C3a | 2 | -10 | Coordinate | C3a | Bust | ÷ | 4 |
| C3b | 13.5 | -10 | Coordinate | C3a | Shoulder Width | ÷ | 2 |
| C3ba | 7.5 | -10 | Coordinate | B | (None) | | |
| B2ba | 9.5 | -3 | Coordinate | | Line 1 | C3b | C3 |
| C4b | 14.5 | -22 | Line Cross | | | | |

| Fixed action | Direction | Measurement | Y Calculation |   | Fixed action | Direction |
|---|---|---|---|---|---|---|
|   |   |   | Measurement | action |   |   |
| 2 | Right | (None) |   |   | -2 | Down |
|   | Right | (None) |   |   |   |   |
|   |   | Length | × | 1 | -4 | Down |
|   | Right | (None) | ÷ | 5 |   |   |
|   | Right | Shoulder Width |   |   |   | Down |
|   |   | Y Branch |   |   |   | Down |
|   | Right | Length | × | 1 |   |   |
|   | Right | (None) |   |   |   |   |
|   | Right | (None) | ÷ | 2 |   | Down |
|   |   | Length |   |   |   |   |
|   | Right | (None) |   |   | -1 |   |
| -2 | Right | (None) |   |   |   | Down |
|   |   | Line 2 | C | C4 |   |   |

FIG. 6(Continue)

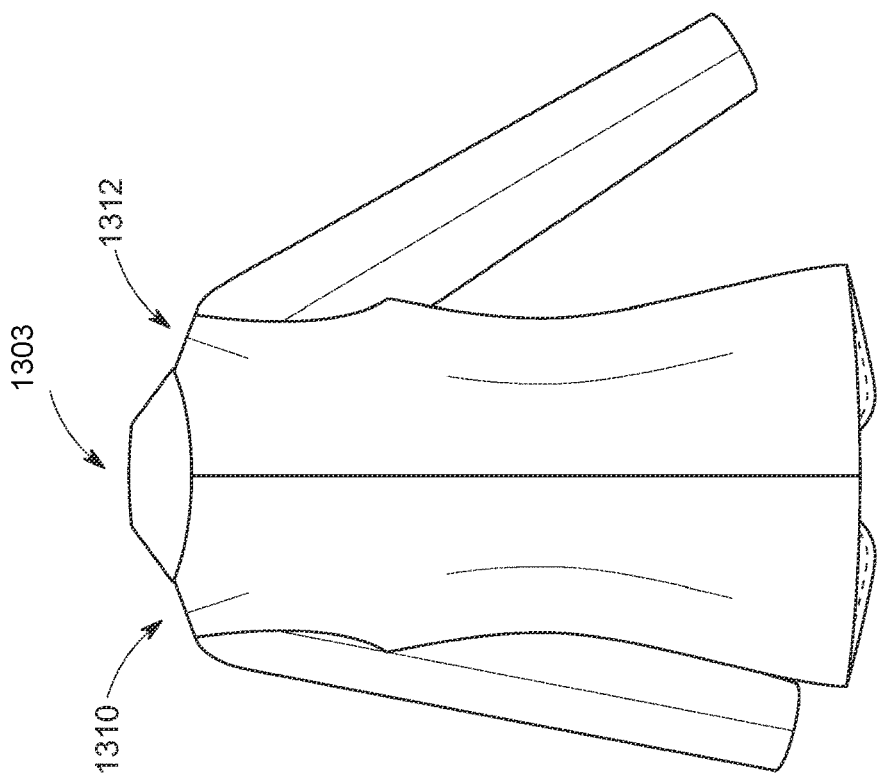
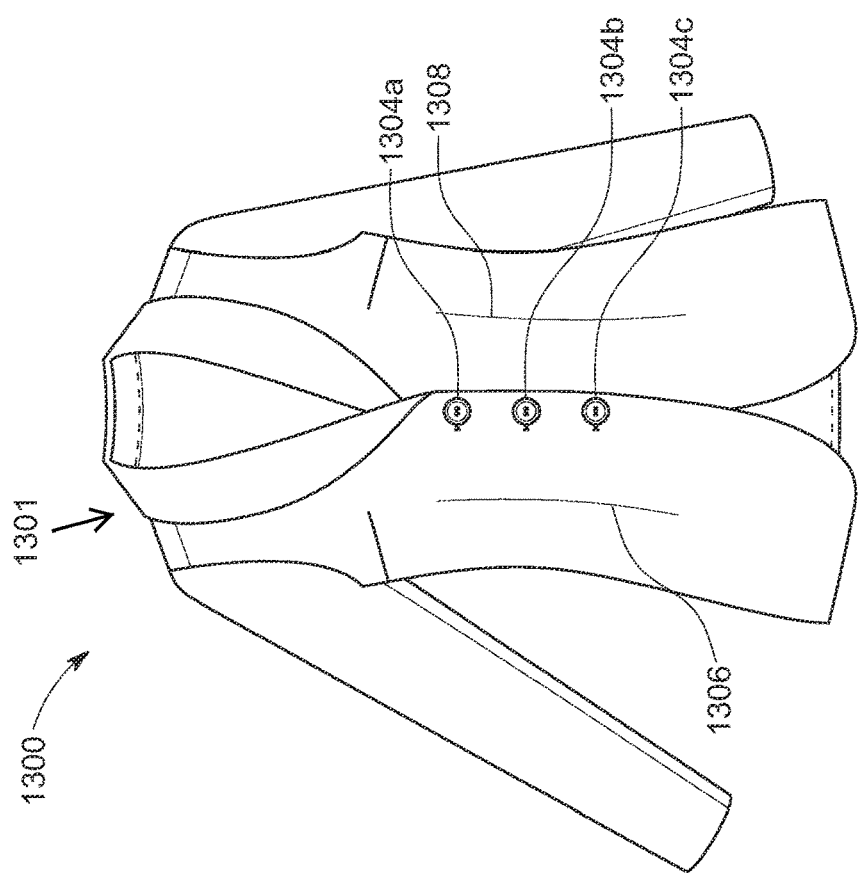
FIG. 13

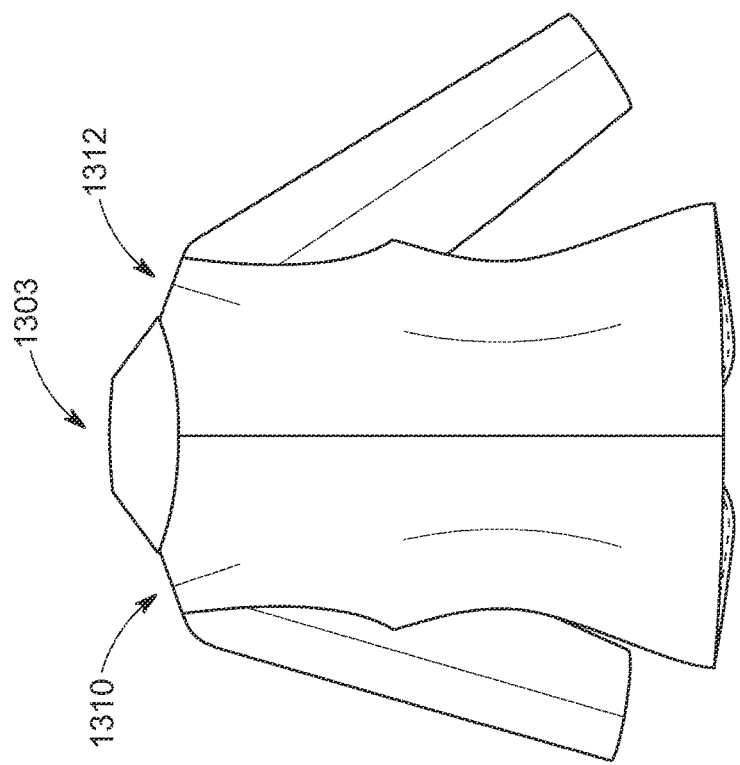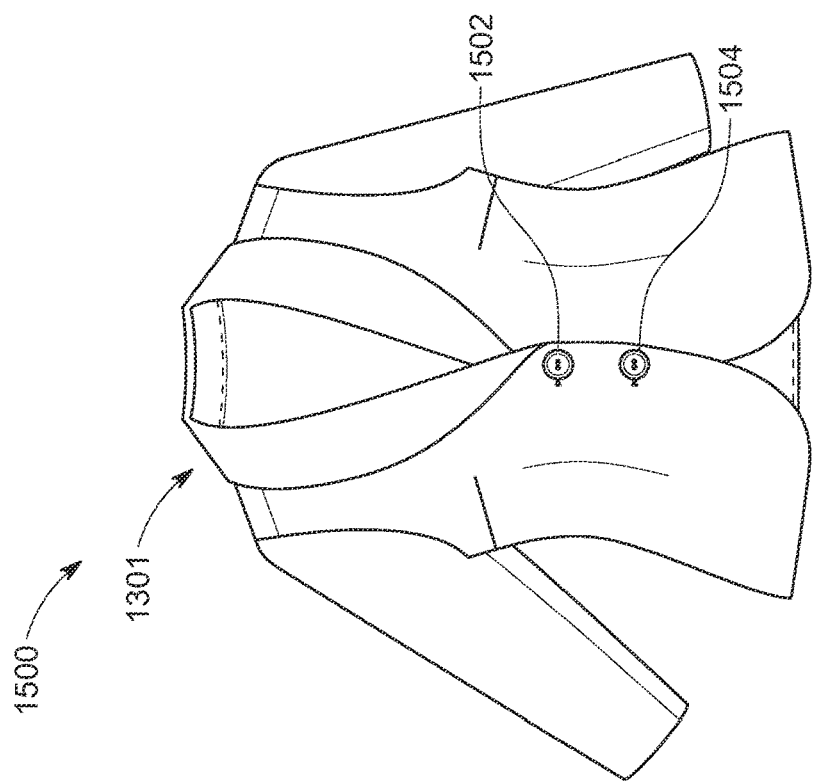
FIG. 15

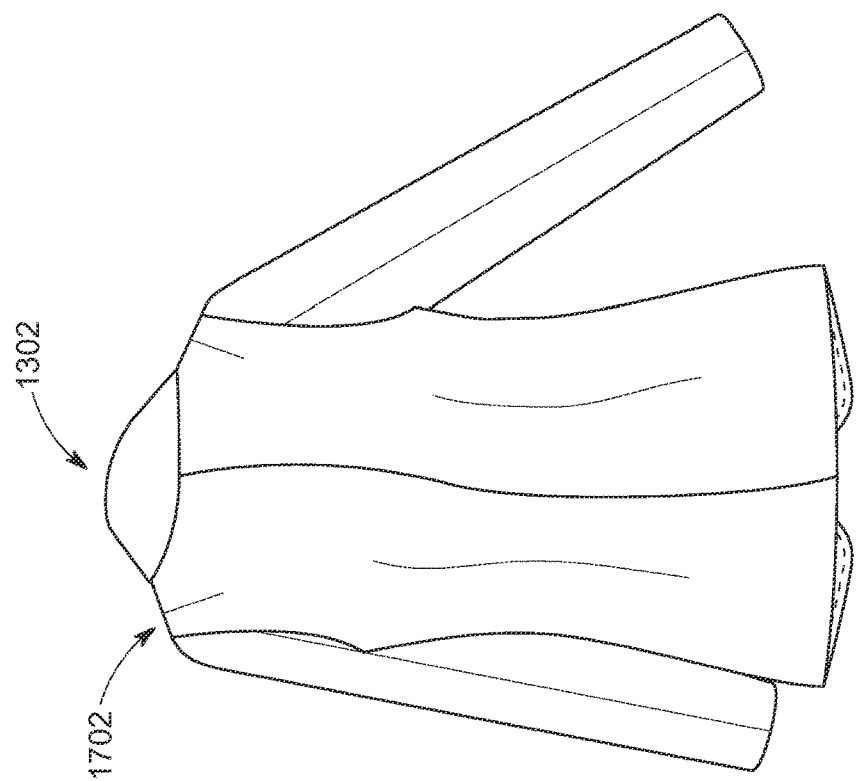
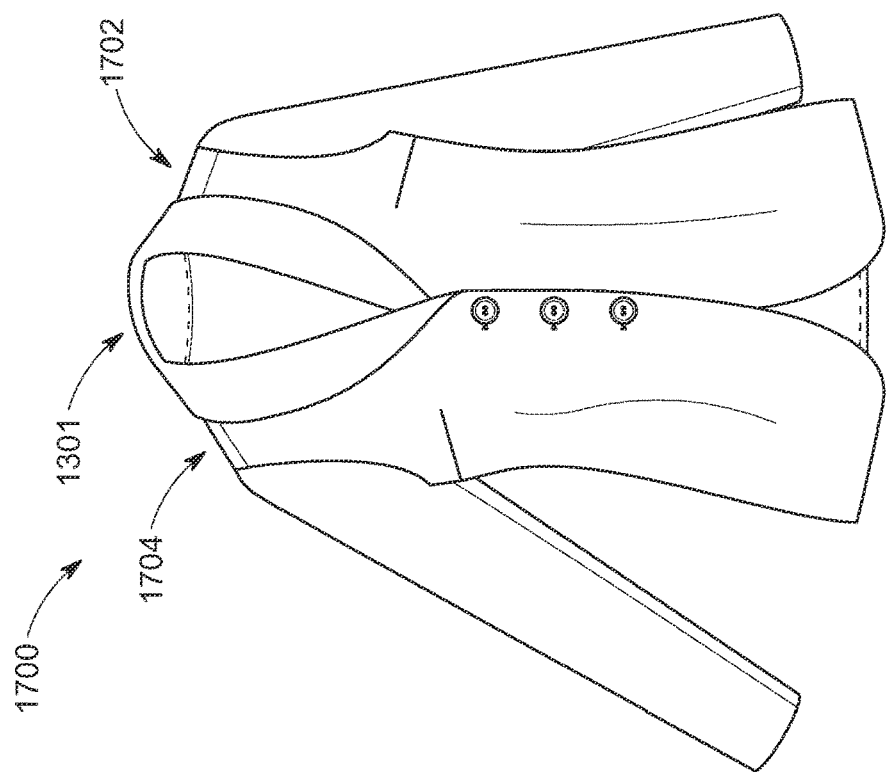
FIG. 17

2100

|   | A | B | C | D | E |
|---|---|---|---|---|---|
| 1 | 602 | 604 |  | 606 | 608 |
| 2 |  |  |  |  |  |
| 3 | Name | Exact Xy Location | | Point Type | Related Point, (Tree Branch) |
| 4 |  |  |  |  |  |
| 5 | Start | 0 | 0 | Start |  |
| 6 | 0 | 0 | 0 | Coordinate | Start |
| 7 | 1 | 3.75 | 0 | Coordinate | 0 |
| 8 | 2 | 3.75 | -16.3 | Coordinate | 1 |
| 9 | f2 | 4.75 | -16.3 | Coordinate | 2 |
| 10 | f3 | 4.75 | 1.75 | Coordinate | f2 |
| 11 | f5 | 4.75 | -24.5 | Coordinate | f2 |
| 12 | f6 | 4.75 | -10.3 | Coordinate | f3 |
| 13 | f7 | 9.302 | -10.3 | Coordinate | f6 |
| 14 | f8 | 16.46 | -10.3 | Coordinate | f6 |
| 15 | f10 | 16.46 | -16.3 | Rectangle | f8 |
| 16 | f15 | 4.75 | -1.25 | Coordinate | f3 |
| 17 | f16 | 7.75 | 1.75 | Coordinate | f3 |
| 18 | f18 | 12.31 | 0.21 | Compass Cross |  |
| 19 |  |  |  |  |  |
| 20 | f19 | 4.75 | -4 | Coordinate | f3 |
| 21 | b2 | 26.43 | -16.3 | Coordinate | f2 |
| 22 | b3 | 26.43 | -0.25 | Coordinate | b2 |
| 23 | f24 | 16.46 | -9.25 | Coordinate | f8 |
| 24 | f25 | 16.46 | -11.3 | Coordinate | f8 |
| 25 | b5 | 26.43 | -24.5 | Rectangle |  |
| 26 | b6 | 26.43 | -8.25 | Coordinate | b2 |
| 27 | b8 | 16.46 | -8.25 | Rectangle |  |
| 28 | B9 | 21.44 | -8.25 | Distance |  |
| 29 | b10 | 21.44 | -16.3 | Rectangle |  |
| 30 | b12 | 21.44 | -24.5 | Rectangle |  |
| 31 | b13 | 18.68 | -0.25 | Coordinate | b3 |
| 32 | b14 | 23.3 | 1.113 | Compass Cross |  |
| 33 |  |  |  |  |  |
| 34 | b15 | 26.43 | -0.13 | Coordinate | b3 |
| 35 | b16 | 23.3 | -0.13 | Rectangle |  |
| 36 | b17 | 26.43 | -7 | Coordinate | b3 |
| 37 | f10a | 16.69 | -16.3 | Coordinate | f10 |
| 38 | f10b | 15.94 | -16.3 | Coordinate | f10 |
| 39 | f14a | 15.42 | -24.5 | Coordinate | b12 |
| 40 | f14b | 15.88 | -24.5 | Coordinate | f5 |

FIG. 21

| F | G | H | I | J |
|---|---|---|---|---|
| colspan Case Study Example - Basic Design and Case 1 Code Changes ||||| 
| | 612 | 614 | X Calculation 610 616 | 618 |
| Measurement | Measurement action | | Fixed action | Direction |
| | x | 1 | | right |
| Across Back Shoulder | ÷ | 4 | | right |
| | | | | |
| | | | 1 | |
| | | | | |
| | | | | |
| | | | | |
| Bust to Bust Eased | ÷ | 2 | | right |
| Bust Eased | ÷ | 3.704 | | right |
| f2 | | | | |
| | | | | |
| Across Back Shoulder | ÷ | 5 | | right |
| Line 1 Start | f16 | | | |
| Line 2 Start | f15 | | | |
| | | | | |
| Bust Eased | ÷ | 2 | | |
| | | | | |
| | | | | |
| | | | | |
| X Coordinate | f5 | | | |
| | | | | |
| X Coordinate | b6 | | | |
| Between | b8 | b6 | Measure (none) | x (none) |
| X Coordinate | b2 | | | |
| X Coordinate | b5 | | | |
| Across Back Shoulder | ÷ | 2 | -0.25 | left |
| Line 1 Start | b13 | | | |
| Line 2 Start | b2 | | | |
| | | | | |
| X Coordinate | b15 | | | |
| | | | | |
| Back CH W Diff half | ÷ | 4 | | right |
| Front CH W Diff half | ÷ | 4 | | left |
| Hip Back Eased | ÷ | 4 | | left |
| hip front eased | | 2 | | right |

FIG. 21(Continued)

| K | L | M | N | O |
|---|---|---|---|---|
| | | 622 ~ Y Calculation 624 | 626 | 628 |
| 620 Measurement | Measurement action | Fixed action | Direction |
| | | | | |
| Center Back Waist Length | x | 1 | -0.25 | down |
| | | | | |
| Front Shoulder to Waist | x | 1 | | |
| Waist to Hip | x | 1 | 0.75 | down |
| Front Shoulder to Bust | x | 1 | | down |
| | | | | |
| Y Coordinate | f8 | | | |
| Across Front Shoulder | ÷ | 5 | | down |
| | | | | |
| Shoulder Length | x | 1 | 0.25 | |
| Across Front Shoulder | ÷ | 2 | 0.25 | |
| Back Break Point Depth | x | 1 | 1 | |
| | | | | |
| Center Back Waist Length | x | 1 | | up |
| Bust Side Dart Width | ÷ | 2 | | up |
| Bust Side Dart Width | ÷ | 2 | | down |
| Y Coordinate | b2 | | | |
| Side Waist Length | | 1 | | |
| Y Coordinate | f8 | | | |
| Percent | 0.5 | | | |
| Y Coordinate | B9 | | | |
| Y Coordinate | B9 | | | |
| | | | | |
| Shoulder Length | | 1 | 0.25 | |
| Back Shoulder to Waist | | 1 | 0.5 | |
| | | | 0.125 | |
| Y Coordinate | b14 | | | |
| Back Break Point Depth | | -1 | | |
| | | | | |
| | | | | |
| | | | | |

FIG. 21(Continued)

| 41 | f26 | 10.42 | 0.849 | Extend Line | |
|---|---|---|---|---|---|
| 42 | b26 | 20.6 | 0.316 | Extend Line | |
| 43 | b25 | 20.91 | -2.87 | Extend Line | |
| 44 | f2a | 4.75 | -17.3 | Coordinate | f2 |
| 45 | f2b | 4 | -17.3 | Coordinate | f2a |
| 46 | f5b | 4 | -24.5 | Coordinate | f5 |
| 47 | b26r | 19.7 | 0.093 | Compass Distance | Center Point |
| 48 | b13r | 18.02 | -1 | Compass | Center Point |
| 49 | f7e | 10.8 | -10.3 | Coordinate | f7 |
| 50 | | | | This is the beginning | |
| 51 | f6b | 9.302 | -11.8 | Coordinate | f7 |
| 52 | d1 | 9.302 | -16.3 | Rectangle | |
| 53 | d4 | 9.302 | -23.8 | Coordinate | d1 |
| 54 | d1a | 8.532 | -16.3 | Coordinate | d1 |
| 55 | d1b | 10.07 | -16.3 | Coordinate | d1 |
| 56 | | | | Code section 2 | |
| 57 | f6b | 9.302 | -11.8 | Coordinate | f7 |
| 58 | d1 | 9.47 | -16.4 | Rectangle | |
| 59 | d2 | 12.38 | -16.4 | Rectangle | |
| 60 | d4 | 9.47 | -23 | Coordinate | d1 |
| 61 | d6 | 12.38 | -22 | Coordinate | d2 |
| 62 | d1a | 8.516 | -16.4 | Coordinate | d1 |
| 63 | d1b | 10.42 | -16.4 | Coordinate | d1 |
| 64 | d2a | 11.42 | -16.4 | Coordinate | d2 |
| 65 | d2b | 13.33 | -16.4 | Coordinate | d2 |
| 66 | | | | | |
| 67 | d7 | 21.44 | -10.3 | Coordinate | B9 |
| 68 | d8 | 21.44 | -23 | Coordinate | b12 |
| 69 | b10a | 21.21 | -16.3 | Coordinate | b10 |
| 70 | b10b | 21.68 | -16.3 | Coordinate | b10 |
| 71 | f6c | 4 | -10.3 | Coordinate | f6 |
| 72 | f10d | 15.94 | -15.3 | Extend Line | |
| 73 | f17 | 7.75 | -1.25 | Rectangle | |
| 74 | b5a | 27.97 | -24.5 | Coordinate | b12 |
| 75 | b2a | 26.19 | -16.3 | Coordinate | b2 |

FIG. 21(Continued)

| Start Point | f16 | | End Point | f18 |
| Start Point | b14 | | End Point | b13 |
| Start Point | B9 | | End Point | b26 |
| | | | | |
| | | | -0.75 | |
| | | | -0.75 | |
| b25 | | | Rotation Point | b26 |
| b25 | | | Rotation Point | b13 |
| | | | 1.5 | right | of the code for the front waist dart and the first IF. If Front Waist Dart >

| | | | | |
| X Coordinate | f2 | | | |
| | | | | |
| Front Waist Dart | ÷ | 2 | | left |
| Front Waist Dart | ÷ | 2 | | right | below drafts two darts instead of one distributing the — 2102

| | | | | |
| X Coordinate | f2 | | | |
| X Coordinate | f2 | | | |
| | | | | |
| | | | | |
| Front Waist Dart | ÷ | 4 | | left |
| Front Waist Dart | ÷ | 4 | | right |
| Front Waist Dart | ÷ | 4 | | left |
| Front Waist Dart | ÷ | 4 | | right |
| | | | | |
| | | | | |
| Back CH W Diff half | ÷ | -4 | | left |
| Back CH W Diff half | ÷ | 4 | | right |
| | | | -0.75 | left |
| Start Point | h1 | | End Point | f10b |
| X Coordinate | f15 | | | |
| Hip Back Eased | ÷ | 4 | 0.5 | right |
| Back CH W Diff half | ÷ | -4 | | left |

FIG. 21(Continued)

| | | | | -2 | |
|---|---|---|---|---|---|
| (none) | | | | -2 | |
| (none) | | | | | |
| Center Back Waist Length | ÷ | 5 | | | |
| | | | | -1 | |
| | | | | | |
| | | | | | |
| Shoulder Length | ÷ | 5 | | | |
| Back Shoulder Dart | x | 1 | | | |
| | | | | | |

1.5" replace the code below with code section 2

| | | | | 1.5 | down |
|---|---|---|---|---|---|
| Y Coordinate | f6b | | | | |
| Waist to Hip | x | -1 | | 1.5 | up |
| | | | | | |
| | | | | | | amount of fabricto be removed for shaping more evenly.

| | | | | 1.5 | down |
|---|---|---|---|---|---|
| Y Coordinate | f6b | | | | |
| Y Coordinate | f7a | | | | |
| Waist to Hip | x | -1 | | 1.5 | up |
| Waist to Hip | x | -1 | | 2.5 | up |
| | | | | | |
| | | | | | |
| | | | | | |
| | | | | | |

| | | | | 2 | down |
|---|---|---|---|---|---|
| | | | | 1.5 | up |
| | | | | | |
| | | | | | |
| | | | | | |
| | | | | | |
| (none) | | | | 1 | |
| Y Coordinate | f16 | | | | |
| | | | | | |
| | | | | | |

| 76 | f15a | 5.25 | -1.25 | Coordinate | f15 |
|---|---|---|---|---|---|
| 77 | f15b | 4 | -1.25 | Coordinate | f15 |
| 78 | b17a | 26.43 | -3.63 | Mid Point | |
| 79 | b18a | 18.68 | -3.63 | Coordinate | b17a |
| 80 | b27 | 19.83 | -8.25 | Line Cross | |
| 81 | f32 | 11.09 | -1.37 | Compass | Center Point |
| 82 | f33 | 15.19 | -3.65 | Compass | Center Point |
| 83 | f33a | 15.8 | -6.35 | Extend Line | |
| 84 | arm3 | 9.879 | -7.68 | Right Angle | C-Clockwise |
| 85 | arm4 | 5.443 | -8.68 | Line Cross | |
| 86 | b16a | 24.92 | -1.19 | Compass | Center Point |
| 87 | b16b | 24.17 | -0.13 | Line Cross | |
| 88 | f19a | 12.25 | -4 | Coordinate | f19 |
| 89 | arm19 | 13.52 | -6.86 | Line Cross | |
| 90 | h4 | 27.76 | -23.5 | Extend Line | |
| 91 | h4r | 21.87 | -24.8 | Right | Clockwise |
| 92 | h3 | 15.57 | -23.5 | Extend Line | |
| 93 | h3r | 21.52 | -24.4 | Right | C-Clockwise |
| 94 | h5 | 22.69 | -24.6 | Line Cross | |
| 95 | The unaltered design has two curves in the front hem ||||||
| 96 | | | | then replace the following | |
| 97 | f5a | 6.75 | -26.5 | Coordinate | f5 |
| 98 | f5c | 3.75 | -27 | Coordinate | f5 |
| 99 | h1 | 15.97 | -23.6 | Extend Line | |
| 100 | h2 | 9.941 | -23.6 | Right Angle | Clockwise |
| 101 | f5d | 11.68 | -25.7 | Extend Line | |
| 102 | h6 | 11.36 | -25 | Distance | |
| 103 | h2a | 13.86 | -23.6 | Distance | |
| 104 | h2b | 9.683 | -26 | Line Cross | |
| 105 | | | | | |
| 106 | f5a | 6.75 | -26.5 | Coordinate | f5 |
| 107 | f5c | 3.75 | -27 | Coordinate | f5 |
| 108 | h1 | 15.97 | -23.6 | Extend Line | |
| 109 | h2 | 9.941 | -23.6 | Right Angle | Clockwise |
| 110 | h2c | 9.518 | -25.8 | Line Cross | |

|  |  |  | 0.5 | right |
|---|---|---|---|---|
|  |  |  | -0.75 | left |
| Between | b3 | b17 |  |  |
| Upper Back Width | x | -2 | -0.25 | left |
| Line 1 | b13r | b18a |  |  |
| f18 |  |  | Rotation Point | f26 |
| f24 |  |  | Rotation Point | f7e |
| Start Point | f33 |  | End Point | f24 |
| Line Start | f24 |  | Corner | f33a |
| Line 1 | f18 | f32 |  |  |
| b14 |  |  | Rotation Point | b26 |
| Line 1 | b14 | b16a |  |  |
| upper front chest width | ÷ | 2 | 0.5 | right |
| Line 1 | f32 | f19a |  |  |
| Start Point | b2a |  | End Point | b5a |
| Line Start | b2a |  | Corner | h4 |
| Start Point | f10a |  | End Point | f14a |
| Line Start | f10a |  | Corner | h3 |
| Line 1 | h3r | h3 |  |  |

(image 1 below). These two curves ensure that the angles at h2 and f5d section with the section below which has points to draw a single curve

|  |  |  | 2 | right |
|---|---|---|---|---|
|  |  |  | -1 | left |
| Start Point | f14b |  | End Point | f10a |
| Line Start | f10b |  | Corner | h1 |
| Start Point | f5c |  | End Point | f5a |
| Between | f5a | h1 | Measure (none) | x (none) |
| Between | h1 | h2 | Measure (none) | x (none) |
| Line 1 | h2a | h6 |  |  |

This is the code section that will correct the angles in the hem

|  |  |  | 2 | right |
|---|---|---|---|---|
|  |  |  | -1 | left |
| Start Point | f14b |  | End Point | f10a |
| Line Start | f10b |  | Corner | h1 |
| Line 1 | h1 | h2 |  |  |

FIG. 21(Continued)

|  |  |  |  |  |
|---|---|---|---|---|
|  |  |  |  |  |
|  |  |  |  |  |
|  |  |  |  |  |
|  |  |  |  |  |
| Line 2 | b8 | b6 |  |  |
| back shoulder angle | x | 1 |  |  |
| bust dart side seam angle | x | -1 |  |  |
| Front Side Waist Upper | x | -1 |  | backward |
| Bust to Bust Eased | ÷ | 1.5 |  |  |
| Line 2 | f33a | arm3 |  |  |
| f16 angle |  | -1 | 180° |  |
| Line 2 | b16 | b15 |  |  |
|  |  |  |  |  |
| Line 2 | f33a | arm3 |  |  |
| (none) |  |  | -1 | backward |
| Hip Back Eased | ÷ | 4 |  |  |
| (none) |  |  | -1 | backward |
| Hip Back Eased | ÷ | 4 |  |  |
| Line 2 | h4 | h4r |  |  |
| stay at 90° and 180° keeping a smooth line. IF h2 is not = to 90 or f5d is not = 180 ~2104 | | | | |
| (image 2 below) instead of two thus correcting the angles. | | | | |
|  |  |  | -2 | down |
|  |  |  | -2.5 | down |
| f10a-h3 | x | -1 |  |  |
| Hip Back Eased | ÷ | 4 |  |  |
| (none) |  |  | 5 |  |
| Percent | 0.5 |  |  |  |
| Percent | 0.35 |  |  |  |
| Line 2 | f5d | f5a |  |  |
| of the garment | | | | |
|  |  |  | -2 | down |
| Line 2 |  |  | -2.5 | down |
| f10a-h3 | x | -1 |  | backward |
| Hip Back Eased | ÷ | 4 |  |  |
| Line 2 | f5c | f5a |  |  |

FIG. 21(Continued)

MADE TO MEASURE APPAREL PATTERNMAKING SYSTEM AND METHOD

CROSS-REFERENCE TO RELATED APPLICATIONS

This application is a non-provisional application which claims priority to U.S. Provisional Patent Application No. 63/228,559 filed on Aug. 2, 2021, which is incorporated by reference in its entirety.

FIELD OF THE DISCLOSURE

This disclosure generally relates to a computer implemented system to create patterns for apparel or various clothing items using a computer application that allows a created pattern to be resized and altered as needed in a quicker and simpler fashion to adjust to various sizes and various body proportions. The computer implemented method may be used for any type of clothing and may simplify the process of creating a made to measure clothing or any other type of clothing including, but not limited to, bespoke clothing. Additionally, the pattern making software provides prompts and questions for the user to respond to or to select a provided option thereby assisting the user in creating the pattern that can then be printed and used to create the made to measure clothing, thus requiring less extensive knowledge and skill beforehand in pattern making to accommodate differences in size and shape among people.

BACKGROUND

For many centuries, apparel was made by hand based on unique measurements taken by tailors and seamstresses for the individuals that were to wear the custom outfits. Tailors and seamstresses were kept very busy with their work in preparing elaborate and beautiful outfits, in particular, for the wealthier class. There are many historical examples of elaborate, tailored outfits that were not purchased in mass from a store or other location but rather ordered and made to fit a specific individual with a high degree of accuracy and precision in the sizing. Over time, patterns were also used to create different types of clothing and to have a base template to work off of, but the patterns were always adjusted by a tailor or seamstress to accommodate the unique measurements and body of the wearer. The tailor or seamstress, then and now, had to have a high amount of skill, knowledge, and understanding of pattern drafting, sewing techniques and methods, and body types to accommodate the pattern to the project at hand and intended wearer or group of wearers.

Over time, countries began developing tables with sizes whereby the measurements for each increasing size were proportional with the measurements for the previous sizes. These proportional size systems became more used as ready to wear and commercial clothing brands were developed, but the clothes designed based on the proportional size systems often did not really fit with the actual unique proportions of the wearer.

ASTM International or ASTM for short (formerly known as American Society for Testing and Materials) is an international standards organization that develops and publishes voluntary consensus technical standards and guidelines for a wide range of materials, products, systems, and services. ASTM has developed a set of tables of Body Measurements for Adult Males and Females ranging from size 00-20 that further take into consideration Body Types, such as straight or curvy. These tables are intended to be used as guidelines. The use of the body measurement information available in these ASTM tables are supposed to assist manufacturers in developing patterns and garments that are consistent with the current anthropometric characteristics of the population of interest, and to in turn reduce or minimize consumer confusion and dissatisfaction related to apparel sizing. The reality is that there are many different body shapes, such as for example, some individuals are straighter (characteristics of teenagers) or curvier (like many adult women) or have a higher or lower bust (characteristic of younger and older women, respectively), and so on and so forth. For those who have disabilities, such as scoliosis, or other issues where the curve of the back and height of one shoulder as compared to another are not uniform, the standard sizing and categorizing of clothing based on height and weight alone are very lacking.

To add to the difficulty in having clothing properly fit based on a size included on a label alone, there is an overwhelming number of size charts and models used throughout the world currently with respect to apparel. For example, the United States has its own type of catalog sizing as compared with Europe or Asia, and this correlates to the average height, weight, and build of the population in these countries. Clothing based on these popular clothing catalog sizes have a variety of differences in dimensions and fit. They are not what could be considered "made to measure" or "couture" because these clothes are based on a generalized sizing chart that assumes the same set of dimensions per size (e.g., size 00 to 20 for men or women and the same with children and baby sizes). These sizing charts are based on a proportional system that increases the dimensions for the bust, waist, and hip of a person in an incremental, proportional manner as the size increases.

FIG. 1A shows an example of chart 102 which provides measurements and sizes associated with commonly known catalog misses' sizes in the US. As can be seen in chart 102 shown in FIG. 1A, the sizing of the Bust, Waist, and Hip increase proportionally with the larger sizes. However, this is a system that does not take into consideration individual differences. It is often that the actual dimensions of a person when measured by hand are very different than the dimensions listed per standard size shown in FIG. 1A. For example, it is frequently the case that the waist is wider or bigger than the hips, but in the example table shown above in FIG. A, the hips are always wider than the waist measurement.

To accommodate such differences, currently, mass produced clothing is made with stretchy material and designed to be somewhat looser to accommodate these differences in body types and sizes. It would be desirable if clothing could be tailored per each individual's dimensions and unique body type and customized without costing a fortune with respect to the amount of skilled labor required to produce such clothing and to produce the patterns that the clothing is based off of using an easy-to-use software application.

There are some existing software applications that can be used to create a pattern for a clothing item or apparel. However, there are many deficiencies with these existing software applications. For example, GERBER ACCUMARK MADE TO MEASURE is a type of existing software that ties points on the pattern pieces to what are called Points of Measure (POM) of the final garment. This software adjusts the pattern pieces according to measurement changes. TUKACAD TAILOR EDITION is another type of software application that works in the same manner. One of the deficiencies of such computer programs is that they can only handle small changes in measurement from one pattern to another.

PATTERNMAKER's MACROGEN is another type of back-end interface that allows the user to use functions to calculate and redraw their own patterns. A deficiency with such a computer application is that it is very complex and does not include any pre-built basic patterns and is only useful for pattern makers who understand complex mathematical functions. None of these existing programs allow a user to make design edits and then reopen the same file to new parameters for a new size with the same edits. Further, none of these existing software applications can handle significant changes in body proportion well, in particular for larger sized patterns for larger sized clothing. Further, the current software applications and systems use pattern grading which is difficult for the user to calculate and are quite inaccurate.

Pattern grading is the process of turning a sample size (sometimes referred to as base size) into additional smaller or larger sizes. Pattern grading is done using a size specification sheet. Pattern grading increases or decreases the size of the original shape of the garment. The grading rule determines how much each POM (point of measurement) is made larger or smaller in order to fit a wide range of sizes. The main purpose of it is to ensure good fit and overall balance of shape in a manufactured garment. Accordingly, for current software systems that ask the user to perform pattern grading, the user has to find which body measurement is closest to the POM at issue and calculate the difference between each size. Then the user has to calculate how many increments are needed, and then divide the difference in measurement between the increments. Then, the user has to figure out or determine how much of each increment is in the X or Y direction and add the X and Y values to the CAD pattern (using for example GERBER ACCUMARK MADE TO MEASURE or another type of software application). One of the difficulties with this is that there is no guideline to help with the decision of how much of each measurement difference to accommodate the change in size should be accounted for or included in each increment.

Accordingly, there is still a need for an improved apparel pattern drafting software that addresses the above-described deficiencies.

SUMMARY

A computer implemented method for producing a made to measure digital sewing pattern is presented. The computer implemented method further includes processing a request to open and create a new file for the made to measure digital sewing pattern in an apparel patternmaking application, whereby the made to measure digital sewing pattern relates to an article of clothing to be worn by an intended wearer. The method includes receiving a selection for a first sloper, wherein the first sloper is extended and organized into a set of objects, wherein the set of objects can be joined together to form the made to measure digital sewing pattern. The method may further include displaying the first sloper on an editable canvas in the apparel patternmaking application, wherein the first sloper comprises a set of labeled anchor points that are connected by connecting objects, wherein the connecting objects comprise lines, curves, or other geometrical elements that make up the set of objects of the first sloper. The set of labeled anchor points correspond to coordinates plottable on an X-Y grid.

The method may further include storing a set of measurements relating to a body of the intended wearer of the article of clothing generated from the made to measure digital sewing pattern and displaying a list of conditional results, wherein the list of conditional results relate to specific design details and changes to be made by the apparel patternmaking application to the first sloper to accommodate unique body proportions of the intended wearer based on an evaluation of the set of measurements and based on selected design changes to be made to the first sloper, wherein the apparel patternmaking application comprises default, pre-defined design details and changes that are adapted to be applied to the first sloper if a condition is triggered. Notably, in a non-limiting embodiment, the list of conditional results is displayed as "if/then" statements having true or false fields, that if a condition is met as true or false, a specific design detail and/or change is applied by the apparel patternmaking application to alter or change an arrangement of one or more labeled anchor points of the set of labeled anchor points and to the connecting objects of the first sloper. The method may further include receiving one or more selections for how to implement the specific design detail and/or change for one or more conditions on the list of conditional results, wherein the user is provided with a first option to apply all default pre-defined design details and changes for the list of conditional results, wherein the user is provided with a second option to select different design details and changes other than the default pre-defined design details and changes for the one or more conditions from the list of conditional results, and wherein the user is provided with a third option to provide new additional conditions with new outcomes or changes to be applied to the first sloper. The method may further include updating the list of conditional results according to the one or more selections provided by the user. Responsive to updating the list of conditional results according to the one or more selections provided by the user, the method may include displaying the first sloper and the set of labeled anchor points in a manner to comply with selected specific outcomes or changes to the first sloper as determined by the list of conditional results, wherein the list of conditional results utilizes the stored set of measurements associated with the intended wearer to modify the first sloper if needed, and wherein the set of labeled anchor points are also tied to the stored set of measurements associated with the intended wearer. The method may further include displaying the made to measure digital sewing pattern that is usable to produce the article of clothing for the intended wearer, receiving a new set of measurements to be applied to the first sloper, and updating the first sloper to reflect any specific design changes based on the new set of measurements, wherein the apparel patternmaking application performs all mathematical calculations to apply the any specific design changes to update the first sloper based on the received one or more selections for the list of conditional results.

In another aspect, the apparel patternmaking application as described herein includes a machine learning trained module configured to identify errors in the one or more selections provided by a user for the list of conditional results, including to identify errors for the provided different outcomes or changes other than the default pre-defined design details and changes for the one or more conditions from the list of conditional results, and the provided new additional conditions with the new outcomes or changes to be applied to the first sloper as provided by the user. The apparel patternmaking application may further include steps for storing of the set of measurements relating to the body of the intended wearer which further comprise receiving a first set of measurements for the body of the intended wearer, analyzing the first set of measurements, and determining whether there are empty measurement fields. If there are any empty measurement fields, the method further includes determining whether values for the empty measurement fields can be calculated. If the empty measurement fields cannot be calculated, the method further includes asking for more data to be provided for the empty measurement fields. If the empty measurement fields can be calculated, the method further includes calculating the empty measurement fields using built in mathematical equations included in the apparel patternmaking application and providing the set of measurements to be stored.

In another aspect, the first set of measurements of the body of the intended wearer are provided as data from a body scanner used to scan the intended wearer, or are manually measured, whereby the apparel patternmaking application can utilize both types of measurements. Further, the apparel patternmaking application includes a plurality of templates for slopers relating to one or more articles of clothing and one or more digital sewing patterns. Further, the plurality of templates for the slopers are editable to create new designs. In a non-limiting embodiment, the apparel patternmaking application can provide cues to prompt a user to provide specific measurements for one or more templates from the plurality of templates. In a non-limiting embodiment, the made to measure digital sewing pattern is exportable to a digital cutting system, or is exportable to be printed on paper, or is exportable as a .dxf file or a .pdf file.

In a non-limiting embodiment, the apparel patternmaking application includes slopers having darts that may be, but are not limited to, shoulder darts, waist darts, and/or bust darts. In a non-limiting embodiment, the set of labeled anchor points are labeled in alphanumerical order. Further, there may be an interface provided that displays the set of anchor points arranged in a framework tree, wherein the framework tree displays a connection between each anchor point of the set of anchor points and how each anchor point relates back to another anchor point. Further, the computer implemented method may include providing an interface displaying a listing of the set of labeled anchor points and a listing of exact X-Y locations on the X-Y grid of each anchor point of the set of labeled anchor points. The interface may further include a listing of measurements that the set of labeled anchor points relate to for the calculation of the X location on the X-Y grid and a list of the measurements that the set of labeled anchor points relate to for the calculation of the Y location on the X-Y grid, as well as any and measurement actions used to position the set of labeled anchor points as displayed on the first sloper. The method may further include providing an interface displaying a listing of seams and seam allowances included in the first sloper. In a non-limiting embodiment, the method may include reusing the first sloper multiple times for different body types or sizes and choosing different conditional outcomes to accommodate the design modifications to the sloper based on body proportion.

Other aspects and advantages of the invention will be apparent from the following description and the appended claims.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. The drawings described herein are for illustrative purposes only of select embodiments and not all possible implementations and are not intended to limit the scope of the present disclosure.

FIG. 1A depicts a prior art chart showing how US catalog sizes are associated with an average height and weight as well as assumed or standardized dimensions associated with the bust, waist, and hip for such sizes.

FIG. 13 depicts a pictorial illustration for a base design having darts for one set of measurements.

FIG. 15 depicts a pictorial illustration showing adjustments made to the base design shown in FIG. 13 based on a different set of measurements for a smaller person or person of shorter height.

FIG. 17 depicts a pictorial illustration showing adjustments made to the base design shown in FIG. 13 based on a different set of measurements for shoulders having different heights for the left and right shoulder.

FIG. 21 depicts an example table and interface representing the code changes made for FIG. 19 and FIG. 20.

DETAILED DESCRIPTION

Figure 1B:
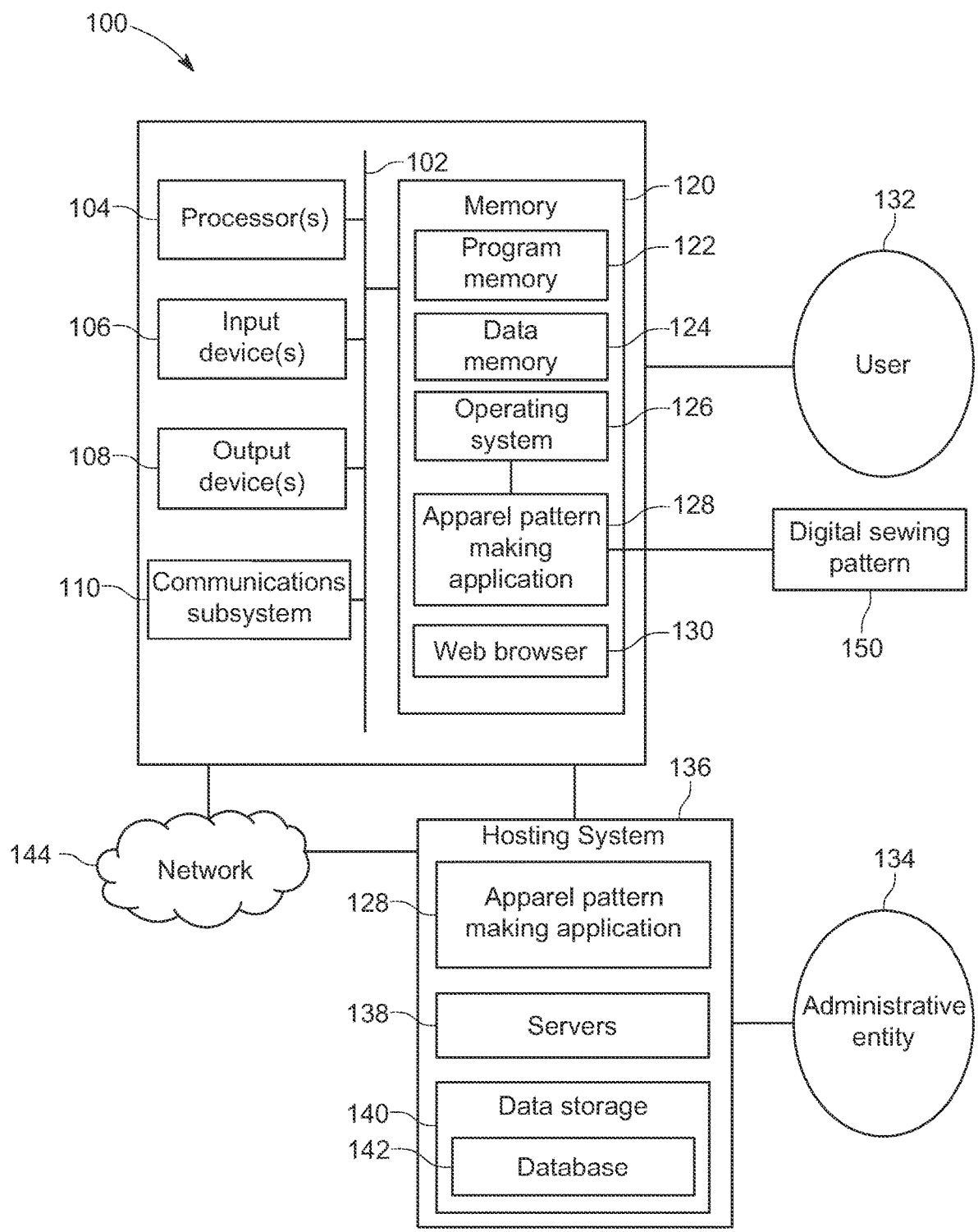
FIG. 1B depicts a block diagram depicting computing devices, components, and systems for implementing an apparel pattern making program in accordance with one or more illustrative embodiments.

Patternmaking for apparel requires a great amount of skill and understanding. Patternmaking requires a great amount of skill and understanding of how the clothing will appear when worn on the body, as well as an understanding of the movement and draping of the garment, and a thorough understanding of sewing and designing. Pattern making also requires an extensive understanding of mathematical formulas and concepts as well. Most patternmakers have to manually calculate any changes to a pattern when the pattern was created for one size and then has to be adjusted to better fit another person of another size and shape. Further, most software programs do not have the ability to adjust to different body proportions and cannot calculate all the possible nuances required for more complicated garments. The existing programs and systems are inadequate for addressing these needs.

The present description describes a computer implemented software application that draws a pattern piece onto a drafting area based on certain provided measurements as well as calculated measurements. The user can edit the basic pattern. Further, the software application keeps track of any user edits to a pattern and how these edits relate to the measurements/parameters set by the user. The software application, as described herein in one or more non-limiting embodiments, enables the user to save the pattern and reload the pattern to new parameters without losing any design changes made. The user is able to create designs that can be used in conjunction with body scanner technology that derives from a thorough set of measurements of a user's body (e.g., 100+ measurements in one or more non-limiting embodiments). The software application, as described herein, may use a series of anchor points that are tied through various mathematical functions to relevant body measurements. The user is then able to add design details to this framework. For each added detail, the user can choose how the new design point should be linked to the framework. Further, a distinguishing feature of the software application as described herein is the ability for the frameworks of the different pattern options to contain if/else clauses that cover major differences in body proportions. The if/else clauses will enable the user to adapt and create designs for patterns and apparel that can be used for made-to-measure clothing without needing an in-depth knowledge of the nuances of pattern fit issues.

In a non-limiting embodiment, the computer implemented application as described herein may be used for either bespoke clothing and/or made to measure type clothing or other types of clothing designs. Bespoke clothing may be entirely made from scratch based on a customer's specifications with far more attention to minute details related to fit. Typically, bespoke clothing also relies on using multiple fittings during the pattern and clothing creation process to ensure an accurate and perfect fit for the individual wearing the clothing items. Made to measure clothing is a different category than bespoke clothing, because Made to Measure clothing (MTM clothing) may refer to custom clothing that is cut to suit the dimensions of a particular shape and size body and sewn using a standard-sized base pattern. Suits and sport coats are examples of very common garments that are made-to-measure. "Custom made" is another way to refer to MTM clothing or apparel. The fit of a made-to-measure garment is expected to be superior to that of a ready-to-wear garment because made-to-measure garments are constructed to fit each customer individually based on a few body measurements to customize the pre-existing pattern. Made-to-measure garments always involve some form of standardization in the pattern and manufacturing. When comparing and contrasting bespoke garments or clothing with made to measure garments or clothing, a made-to-measure garment will usually be more expensive than a ready-to-wear garment but cheaper than a bespoke one, because the bespoke one is made from scratch and involves many design changes and edits for the wearer. Additional details and advantages are provided below along with a description of the accompanying Figures.

Turning to FIG. 1B, FIG. 1B illustrates an exemplary system for one or more computing devices and the various exemplary components that may be employed in practicing one or more non-limiting embodiments of the invention as described herein. Computing device 100 may be any type of computing device known or to be created in the future. This may include, without limitation, fixed in place computers, such as desktop computers, or mobile computing devices. Mobile computing devices may include, but are not limited to, laptop computers, smartphones and mobile phones, tablets, wearable electronic computing devices such as watches or glasses, or any other type of mobile electronic, computing device.

FIG. 1B provides a schematic illustration of one embodiment of a computing device 100 that can perform the methods provided by the various other listed embodiments, as described herein, and/or can function as the host computer system, a remote kiosk/terminal, a point-of-sale device, a mobile device, a set-top box, and/or a computer system. FIG. 1B is meant only to provide a generalized illustration of various components, any or all of which may be utilized as appropriate. FIG. 1B, therefore, broadly illustrates how individual system elements may be implemented in a relatively separated or relatively more integrated manner.

Computing device 100 may be any type of information handling system, including, but not limited to, any type of computing device as noted above. To reiterate, this may include small handheld devices, such as handheld computer/mobile telephones or may include large mainframe systems, such as a mainframe computer. Further examples of handheld computing devices may include personal digital assistants (PDAs), personal entertainment devices, such as MP3 players, portable televisions, and compact disc players. Other examples of computing devices 100 may include, but are not limited to, laptops, notebooks, workstation computers, personal computer systems, as well as servers (e.g., servers 138). Computing devices 100 can be used by various parties described herein and may be connected on a computer network, such as computer network 144. Types of computer networks that can be used to interconnect the various information handling systems may include, but are not limited to, Local Area Networks (LANs), Wireless Local Area Networks (WLANs), the Internet (e.g., World Wide Web), the Public Switched Telephone Network (PSTN), other wireless networks, and any other network topology that can be used to interconnect the information handling systems.

The computing device 100 is shown comprising hardware elements that can be electrically coupled via a bus 102 (or may otherwise be in communication, as appropriate). The hardware elements of computing device 100 may include one or more processors 104, including without limitation one or more general-purpose processors and/or one or more special-purpose processors (such as digital signal processing chips, graphics acceleration processors, and/or the like). Computing device 100 may further include one or more input devices 106, which can include without limitation one or more cameras, sensors (including inertial sensors), a mouse, a keyboard and/or the like, which may be utilized in the implementation of apparel patternmaking application 128.

In addition to the above, computing device 100 may include one or more output devices 108 such as the device display. Furthermore, in some embodiments, an input device 106 and an output device 108 of computing device 100 may be integrated, for example, in a touch screen or capacitive display as commonly found on mobile computing devices as well as desktop computers and laptops.

Processors 104 may have access to a memory such as memory 120. Memory 120 may include one or more of various hardware devices for volatile and non-volatile storage and may include both read-only and writable memory. For example, memory 120 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 120 is not a propagating signal divorced from underlying hardware; a memory is thus non-transitory. Memory 120 may include program memory such as program memory 122 capable of storing programs and software, such as an operating system such as operating system 126, apparel patternmaking application 128, and other computerized programs or application programs. Memory 120 may also include data memory such as data memory 124 that may include database query results, configuration data, settings, user options or preferences, etc., which may be provided to program memory 122 or any element of computing device 100.

The computing device 100 may further include (and/or be in communication with) one or more non-transitory storage devices, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage may be used in a number of embodiments discussed herein. Further, the storage devices may be non-volatile data storage devices in one or more non-limiting embodiments. Further, computing device 100 may be able to access removable nonvolatile storage devices that can be shared among two or more information handling systems (e.g., computing devices) using various techniques, such as connecting the removable nonvolatile storage device to a USB port or other connector of the information handling systems.

The computing device 100 might also include a communications subsystem 110, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 110 may permit data to be exchanged with a network (e.g., such as network 144), other computer systems, and/or any other devices.

The computing device 100 also can comprise software elements, shown as being currently located within the memory 120, which in some instances may include an operating system 126, device drivers, executable libraries, and/or other code, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt computing device 100 to perform one or more operations in accordance with the described methods.

A set of these instructions and/or code might be stored on a computer-readable storage medium, such as the storage device(s) described above. In some cases, the storage medium might be incorporated within a computer system, such as computing device 100. In other embodiments, the storage medium might be separate from computing device 100 (e.g., a removable medium, such as a compact disc or USB stick), and/or be provided in an installation package, such that the storage medium can be used to program, configure, and/or adapt a general-purpose computer with the instructions/code stored thereon. These instructions might take the form of executable code, which is executable by the computing device 100 and/or might take the form of source and/or installable code, which, upon compilation and/or installation on the computing device 100 (e.g., using any of a variety of generally available compilers, installation programs, compression/decompression utilities, etc.) then takes the form of executable code.

Substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

Some embodiments may employ a computer system (such as the computing device 100) to perform methods in accordance with the disclosure. For example, some or all of the procedures of the described methods may be performed by the computing device 100 in response to one or more processors 104 executing one or more sequences of one or more instructions (which might be incorporated into the operating system 126 and/or other code contained in the memory 120). Such instructions may be read into the memory 120 from another computer-readable medium, such as one or more of the storage devices. Merely by way of example, execution of the sequences of instructions contained in the memory 120 may cause the one or more processors 104 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 100, various computer-readable media might be involved in providing instructions/code to the one or more processors 104 for execution and/or might be used to store and/or carry such instructions/code (e.g., as signals). In many implementations, a computer-readable medium is a physical and/or tangible storage medium. Such a medium may take many forms including, but not limited to, non-volatile media, volatile media, and transmission media. Non-volatile media may include, for example, optical and/or magnetic disks which may be an example of storage devices. Volatile media may include, without limitation, dynamic memory, which may be a type of memory included in memory 120. Transmission media may include, without limitation, coaxial cables, copper wire and fiber optics, including the wires that comprise the bus 102, as well as the various components of the communications subsystem 110 (and/or the media by which the communications subsystem 110 provides communication with other devices). Transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 110 (and/or components thereof) generally will receive the signals, and the bus 102 then might carry the signals (and/or the data, instructions, etc. carried by the signals) to the memory 120, from which the one or more processors 104 retrieves and executes the instructions. The instructions received by the memory 120 may optionally be stored on a non-transitory storage device either before or after execution by the processor(s) 104.

In one or more embodiments, computing device 100 is in communication with one or more networks, such as network 144. Network 144 may include a local area network (LAN), such as a company Intranet, a metropolitan area network (MAN), or a wide area network (WAN), such as the Internet or World Wide Web. Network 144 may be a private network, a public network, or a combination thereof. Network 144 may be any type of network known in the art, including a telecommunications network, a wireless network (including Wi-Fi), and a wireline network. Network 144 may include mobile telephone networks utilizing any protocol or protocols used to communicate among mobile digital computing devices (e.g., computing device 100), such as GSM, GPRS, UMTS, AMPS, TDMA, or CDMA. In one or more non-limiting embodiments, different types of data may be transmitted via network 144 via different protocols. In further non-limiting other embodiments, computing device 100 may act as a standalone device or may operate as a peer machine in a peer-to-peer (or distributed) network environment.

Network 144 may further include a system of terminals, gateways, and routers. Network 144 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

In one or more non-limiting embodiments, a computing device, such as computing device 100 may include a web browser such as web browser 130. Web browser 130 may be any type of web browser known in the art that may be used to access one or more web applications (e.g., apparel patternmaking application 128) on user computing devices 100 or the like. Web applications are applications that are accessible by network 144 and may be located on the Internet or World Wide Web. Web browser 130 may include a variety of hardware, software, and/or firmware generally operative to present a web application to a user via a display device 108 (e.g., touchscreen or other type of monitor or display device) on a computing device. Examples of suitable web browsers include, but are not limited to, MICROSOFT EXPLORER, MOZILLA FIREFOX, and APPLE SAFARI. Web browser 130 may be previously installed by the manufacturer or company associated with the computing device 100, or alternatively, may be downloaded onto computing device 100 or any other computing device. Web browser 130 may be stored in a separate storage device and/or memory 120.

In one or more non-limiting embodiments, apparel patternmaking application 128 may be a software program or module configured to create and edit tangible digital sewing patterns 150 for apparel. The digital sewing patterns 150 may notably be exported as a .pdf or .dxf file in one or more non-limiting embodiment. Further, the digital sewing patterns 150 may be sent to a digital cutting board and/or printed on paper for use in making and producing an article of clothing.

In one or more non-limiting embodiments, apparel patternmaking application 128 may be implemented as a web service. As known in the art, a web service may be a software module or software program (e.g., apparel patternmaking application 128) that is designed to implement a set of tasks that is accessible from multiple computing devices, such as computing device 100, over a network, such as network 144. In particular, apparel patternmaking application 128 may be implemented as a web service accessible using the World Wide Web as the connecting network 144, although any alternative type of network may be used. Apparel patternmaking application 128, when implemented as a web service, can be searched by any user (e.g., user 132) using web browser 130. Apparel patternmaking application 128 when implemented as a web service can be searched for over the network 144 using the input devices 106 of a computing device and can also be invoked accordingly. Further, apparel patternmaking application 128 when invoked as a web service would be able to provide functionality to the client or user which invokes that web service.

When apparel patternmaking application 128 is implemented as a web service, a client or party may invoke a series of web service calls via requests to one or more servers 138 that are part of the hosting system 136 which would host the actual web service. In one or more non-limiting embodiments, hosting system 136 may be a cloud-based type hosting system. "Cloud-based" is a term that refers to applications, services, or resources (e.g., apparel patternmaking application 128) made available to users on demand via a network, such as network 144, from a cloud computing provider's server. In one non-limiting embodiment, administrative entity 134 may be the cloud computing provider and may use servers 138 to provide access to apparel patternmaking application 128.

Hosting system 136 may include data storage systems 140 that can provide access to stored data by applications running on computing devices (e.g., 100) that may be geographically separate from each other, provide offsite data backup and restore functionality, provide data storage to a computing device with limited storage capabilities, and/or provide storage functionality not implemented on a computing device (e.g., 100).

The hosting system 136 may be a service that can be implemented as a web service, in one or more non-limiting embodiments, with a corresponding set of Web Service Application Programming Interfaces (APIs). The Web Service APIs may be implemented, for example, as a Representational State Transfer (REST)-based Hypertext Transfer Protocol (HTTP) interface or a Simple Object Access Protocol (SOAP)-based interface. Any programming languages may be used to create or operate apparel patternmaking application 128 as a web service, including, but not limited to .Net, Java, and XML. Further, apparel patternmaking application 128 as a web service may use standardized industry protocol for the communication and may include well-defined protocols, such as Service Transport, XML Messaging, Service Description, and Service Discovery layers in the web services protocol stack.

For instance, the hosting system can be implemented such that client applications (for example, executing on computing device 100) can store, retrieve, or otherwise manipulate data objects in the hosting system 136. The hosting system 136 can be implemented by one or more server devices 138, which can be implemented using any type of computing device. The hosting system 136 may include one or more machine learning trained models stored on servers 138 to perform one or more instructions of the apparel patternmaking application 128.

Figure 2:
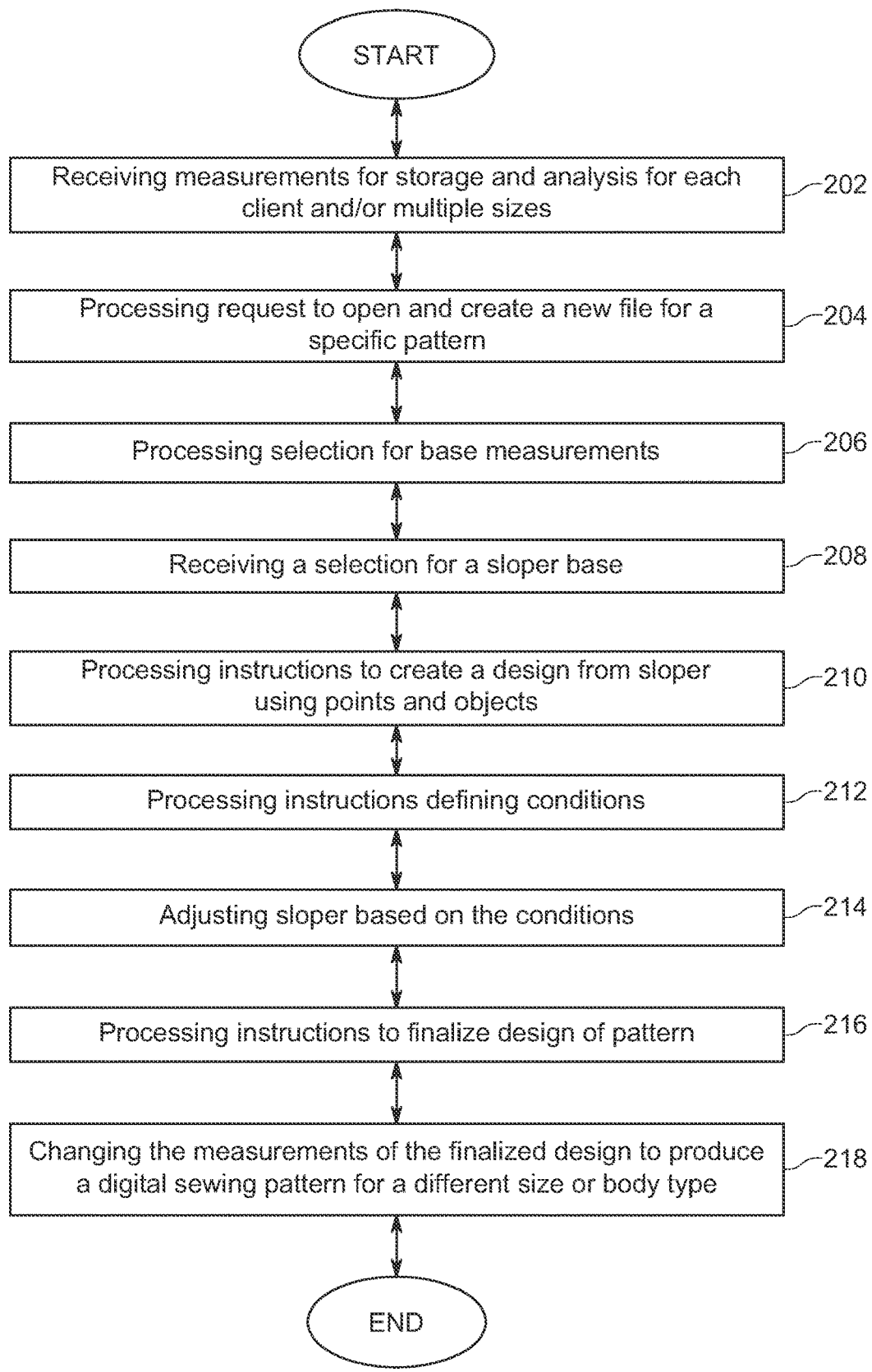
FIG. 2 depicts a flowchart showing an exemplary method of using an apparel patternmaking application.

In one or more non-limiting embodiments, administrative entity 134 is the provider and creator of apparel patternmaking application 128. Administrative entity 134 may provide the application programming interface (e.g., apparel patternmaking application 128) for use by user 132. Administrative entity 134 may be able to manipulate and alter apparel patternmaking application 128 to affect the operation and maintenance of apparel patternmaking application 128 on server(s) 138 and as stored on one or more data storage devices 140 that are part of the hosting system 136. Data storage devices 140 included for storing any data associated with apparel patternmaking application 128 may include one or more databases 142 that store live and historical sensor data in one or more non-limiting embodiments. Data storage devices 140, via databases 142 in some cases, may be able to store all data obtained from user 132, such as biometrics, as shown in FIG. 2. While administrative entity 134 is depicted as a single element communicating over network 144 and through the hosting system 136, it is noted that administrative entity 134, in one or more non-limiting embodiments, may be distributed over network 144 in any number of physical locations.

In one or more non-limiting embodiments, apparel patternmaking application 128 may alternatively be a downloadable software module that is capable of being stored directly on a computing device, such as computing device 100, rather than acting as a web service accessible through a computing device's web browser 130. Accordingly, any user may be able to download and store apparel patternmaking application 128 on computing device 100 as a computer-based application and software module that runs using the working engines and modules on the computing device. In some embodiments, apparel patternmaking application 128 may be preinstalled on computing device 100 or any other computing device by the manufacturer or designer or other entity. Apparel patternmaking application 128 may be innate, built into, or otherwise integrated into existing platforms such as, without limitation thereto, a website, third-party program, iOS™, Android™, Snapchat™, Getty Images™, Instagram™, Facebook™, or any other platform capable of transmitting, receiving, and presenting data.

Apparel patternmaking application 128 may be stored on computing device 100 or any other computing devices and may also be stored or otherwise accessible by one or more servers 138 over network 144 by any party. The storage devices may include a non-transitory computer readable medium including instructions, which when executed by a computer or processor (such as processors 104) may cause the computer or processor to perform operations to implement apparel patternmaking application 128. Additionally, or alternatively, apparel patternmaking application 128 may be a software application that is downloadable and usable from any type of mobile computing device 100.

As shown in FIG. 1B, computing device 100 may belong to a user, referred to in FIG. 1B, such as user 132. User 132 may be a user that intends to access apparel patternmaking application 128 using his or her computing device 100.

As noted above, in one non-limiting embodiment, apparel patternmaking application 128 may be implemented as a web service as described above. Accordingly, apparel patternmaking application 128 may be accessed by any party, including user 132, over the computer network 144 using their web browsers 130 to use any features included with apparel patternmaking application 128. Further information about other components of apparel patternmaking application 128 are included below with respect to FIG. 2-FIG. 12.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Figure 4:
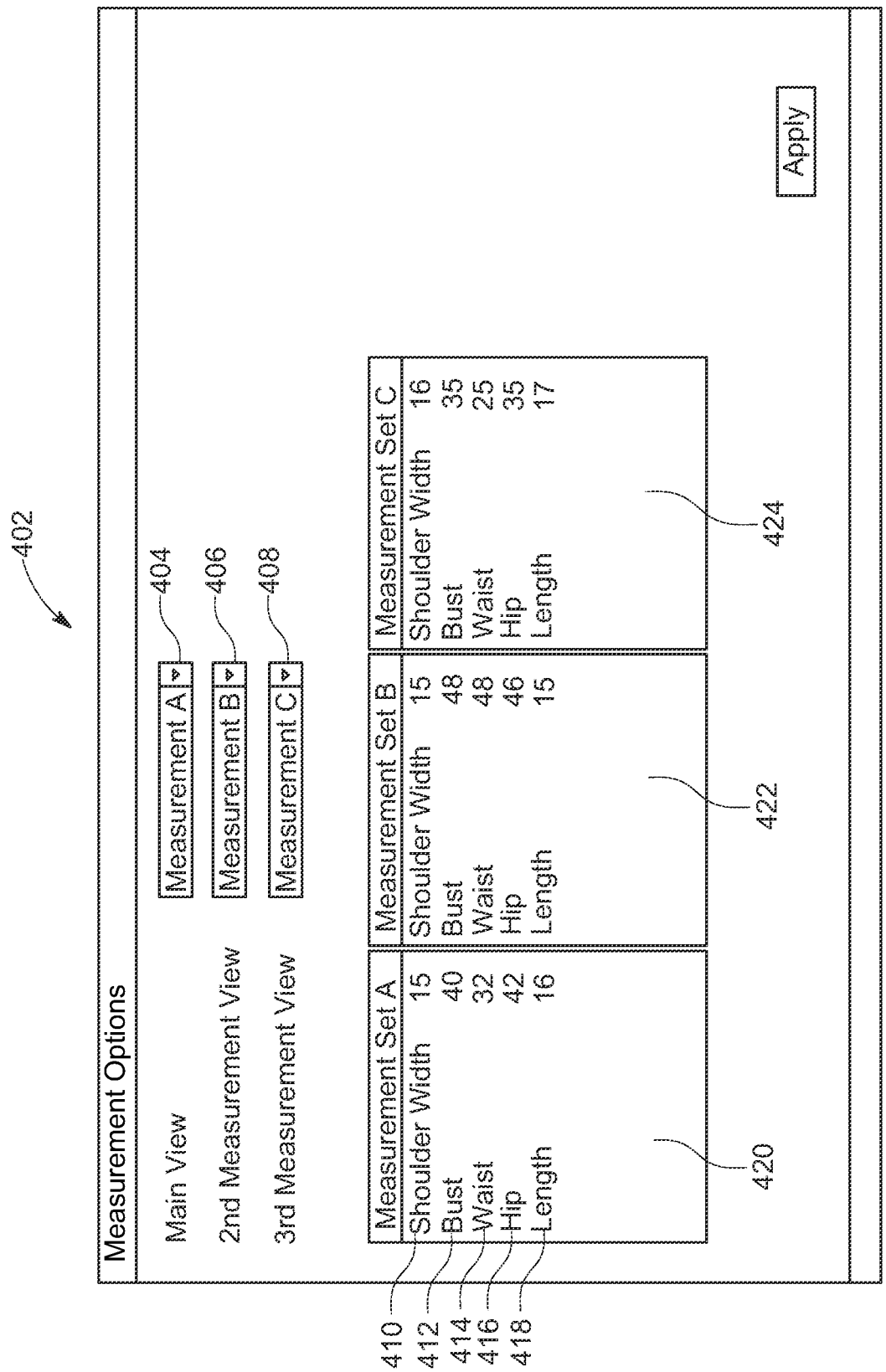
FIG. 4 depicts an exemplary table illustrating three sets of base measurements that may be used in designing a pattern.

Turning to FIG. 2, FIG. 2 is a flowchart for an exemplary method of creating made to measure or draft to measure patterns for apparel using a computer implemented application. The term "Draft to Measure" may also be used to referred to the specific patterns created via the apparel patternmaking application 128 as described herein. At step 202, the process may begin by receiving measurements. In a non-limiting embodiment, the measurements may all be provided by a body scanner equipped to provide such measurements of a user's body. A body scanner may be a 3D type body scanner particularly suited for made to measure type clothing. The body scanner is able to scan an actual user's body from top to bottom and obtain numerous relevant and precise measurements for the whole body. The body scanner is able to scan the whole body in a matter of seconds. The measurements obtained from body scanners is usually considered more precise and accurate than hand measuring and can help to ensure that any clothes made based on patterns that implement such measurements are more comfortable and have a better fit, so the user is more satisfied. That being said, the process at step 202 may include alternatively, or additionally, measurements obtained by hand in which a tailor or seamstress or other individual uses one or more measuring tools such as a tape measure to obtain and record relevant measurements such as the shoulder width, bust, waist, hip, length (e.g., as shown in FIG. 4). The process may combine both hand measurements and measurements obtained from a body scanner in one or more non-limiting embodiments. These measurements, however obtained and provided, may be stored in the apparel patternmaking application 128 and processed for analysis for each client and/or multiple sizes. One of the goals of the apparel patternmaking application 128 is to be able to take a pattern created for one size, provide any measurements for a larger or smaller size, and automatically edit the pattern to the new size without requiring the user to make manual calculations and incremental adjustments as is the case with the traditional grading system.

At step 204, the process may continue with the apparel patternmaking application 128 processing a request to open and create a new file for a specific pattern. At step 206, the apparel patternmaking application 128 may process a selection for base measurements. Accordingly, a user selects base measurements needed for the pattern. At step 208, the apparel patternmaking application 128 receives and processes a selection for a sloper to begin with. A sloper, as understood in the art, refers to a basic pattern without any added finalized design elements. A sloper is a 2D pattern version of a 3D form. The sloper represents the basic measurements of one's body and a garment designed for one's body. Typically, commercial pattern producers use slopers that fit the "average" body shape, which is why ready to wear or store-bought clothes are not usually considered made to measure clothing. The apparel patternmaking application 128 allows the slopers created in the apparel patternmaking application 128 to accurately represent the dimensions and measurements with precision and accuracy for a user's body and shape. A bodice sloper, for example, shows the length, width, and shape of one's torso, as well as the bust points and length of darts. The apparel patternmaking application 128 can be used to create the apparel marker. In apparel manufacturing, an apparel marker is a special kind of stencil that illustrates how pattern pieces of one or more garments should be cut from several layers of fabric. It is the marker planner's job to arrange the pattern pieces efficiently, wasting as little of the fabric as possible.

Figure 12:
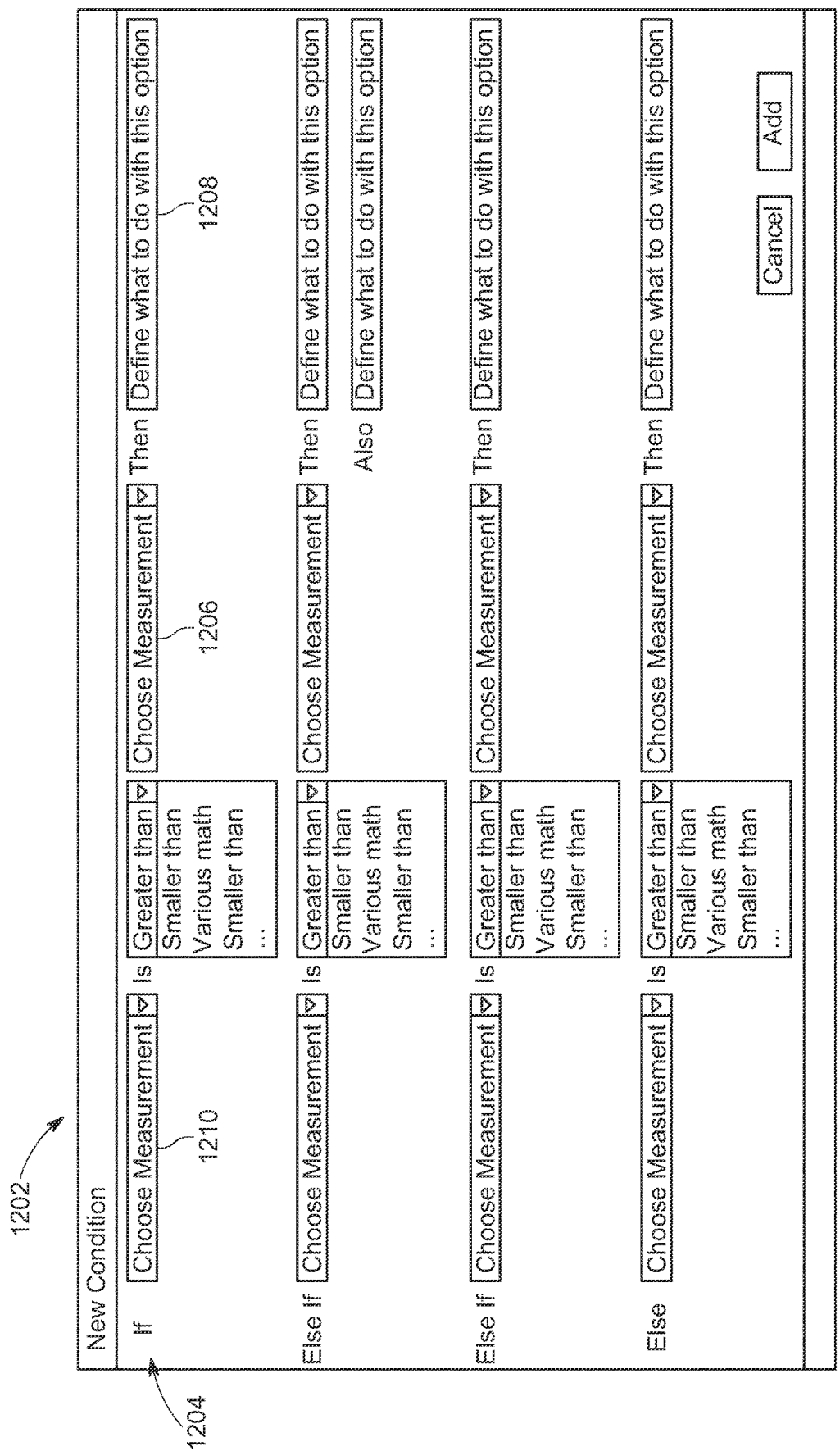
FIG. 12 depicts a table illustrating an interface for selecting options for if/else conditional queries.
Figure 18:
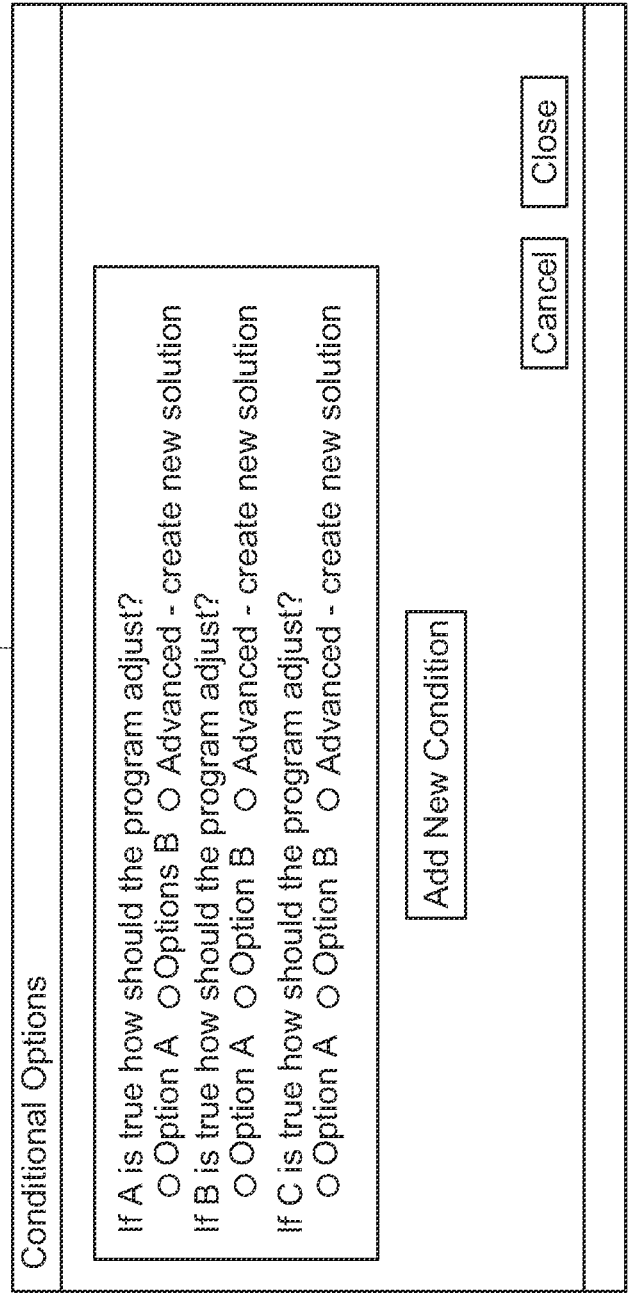
FIG. 18 depicts a pictorial illustration of a conditional table interface with example conditions.

It is noted that in a non-limiting embodiment, the apparel patternmaking application 128 includes a database of a vast variety of templates that the user may select from. Notably, and advantageously, the user does not have to begin from a blank slate to create a digital sewing pattern. Rather, the user may select from among the templates, a first sloper to use and modify it as needed, including with the use of the conditional if/then statements, as referenced at step 212 in FIG. 2 and step 312 in FIG. 3. An exemplary interface 1202 for adding conditions is shown in FIG. 12, and another example interface 1802 is shown in FIG. 18.

The database of templates for slopers (e.g., sloper 504 shown in FIG. 5) may include a variety of templates for different kinds of articles of clothing ranging from clothing worn on the body that can be categorized as casual, business related, dressy, formal, sportswear or activewear, pajamas or sleep attire, underwear and undergarments, socks, hats and headwear, and any type or article of clothing without limitation. The templates may be selectable by the user browsing or searching in the templates database of the apparel patternmaking application. Each template may be categorized under a type of clothing or a type of digital pattern in some cases with a preview of the template as well as a brief explanation or description that may be helpful for the user to use in selecting the template.

At step 210, the apparel patternmaking application 128 processes instructions to create a design from the sloper using anchor points and objects. At step 212, the apparel patternmaking application 128 may process instructions for defining if/else conditions. At step 214, the sloper as displayed on the display screen of the apparel pattern making application 128 may be adjusted based on the conditional results entered into the apparel pattern making application 128 interfaces for how to handle or adjust to certain measurements being greater than or less than or another variable as compared to the other (e.g. see FIG. 12 and FIG. 18). It is noted that the step 212 may be performed after the step 206 and before step 208 in one or more non-limiting embodiments.

At step 216, the method further includes processing instructions to finalize the design of the sloper and ultimately the digital sewing pattern 150 for the entered set of base measurements and for the conditional results implemented on the sloper. At this point, the digital sewing pattern 150 may be sent for processing to a manufacturer or designer. For example, a digital sewing pattern 150 may be printed on paper and used to create various made to measure articles of clothing. Alternatively, the digital sewing pattern 150 may be exported to .pdf, .dxf, or sent to a digital cutting table. Further, the digital sewing pattern 150 may be converted to a marker as well.

At step 218, the finalized sloper may be adjusted and changed to accommodate another size and set of base measurements. Accordingly, the user 132 may enter different base measurements (e.g., returning to step 206) and then enter any updated conditional if/then clauses and responses, in order for the sloper to automatically be adjusted by the apparel pattern application 128. Notably, in order for the user 132 to change the size or body/proportions the sloper relates to or corresponds to, the user 132 does not have to start again from scratch. Rather, the apparel pattern application 128 includes an interface to provide a new set of measurements and allows the sloper to be adjusted to the new measurements while taking into consideration any preferred design details and outcomes to the provided or added if/then clauses, which is further discussed below, especially with respect to FIGS. 13-21. FIGS. 3-22 provide further details about each of these exemplary steps 202-218 for using apparel patternmaking application 128 to create made to measure and customized patterns for apparel as described in FIG. 2.

Figure 3:
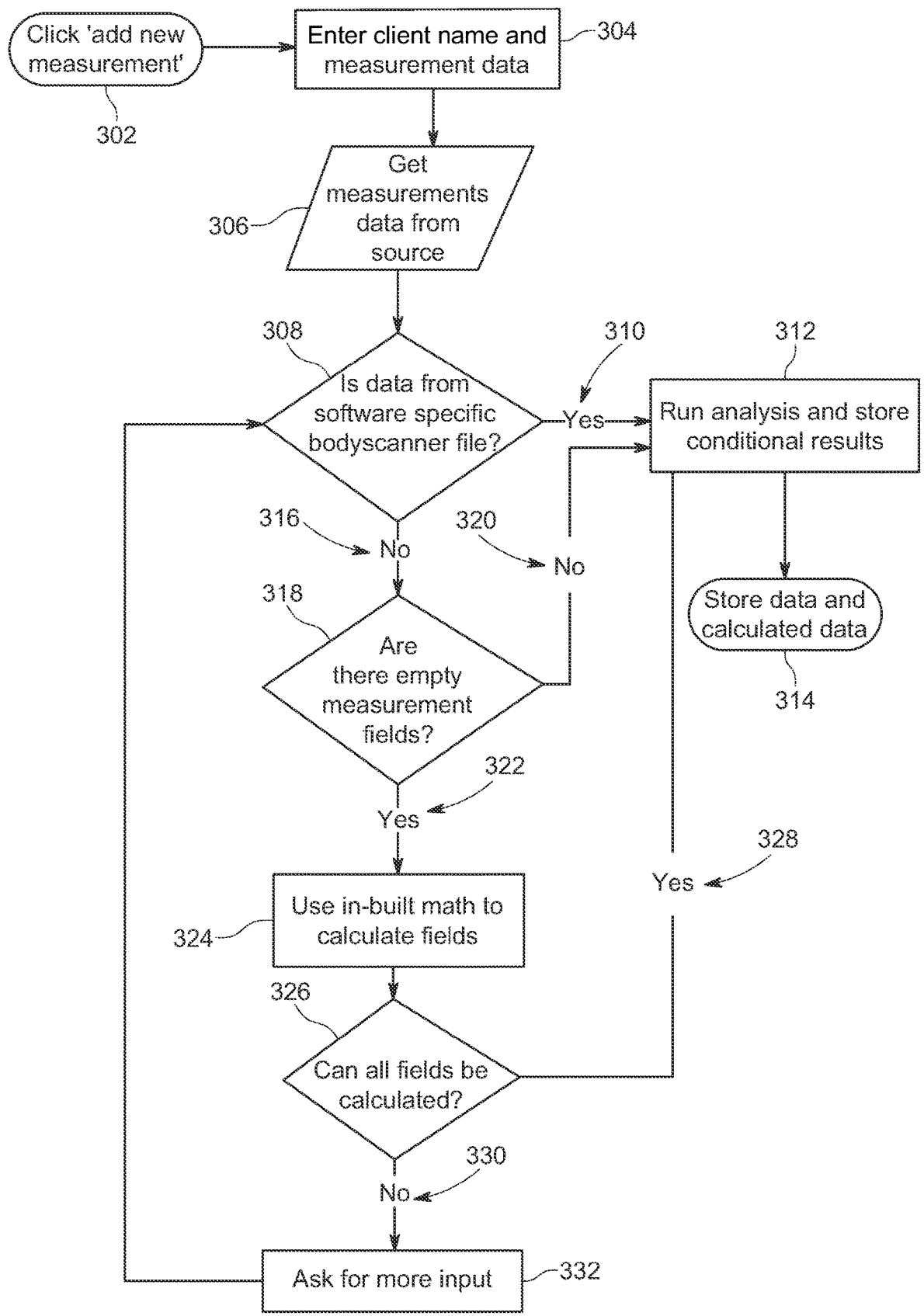
FIG. 3 depicts a flowchart of an exemplary method for adding measurements to an apparel patternmaking application.

FIG. 3 is an exemplary process and flowchart for storing measurements and analysis data for each client, as described above in step 202 of FIG. 2. As shown in FIG. 3 at step 302, the process may include adding new measurements related to a user's body who requires or needs a pattern to be made for one or more articles of clothing. At step 304, the process enters a client or a user's name and measurement data. At step 306, the process obtains the measurement data from the source whether the source is from the user who manually measured the data or whether the application 128 imports the measurement data. The new measurements may be determined by hand measurements or data measurements obtained from a body scanner. Unlike other applications, the apparel patternmaking application 128 is capable of storing, analyzing, and calculating relevant measurements or fields using either manually measured measurements, scanner imported data obtained from a body scanner, or using both. Body measurements obtained from a body scanner often contain measurements that cannot be measured by hand. The apparel patternmaking application 128 can use both type of measurement data whether manually measured by hand or imported from a body scanner.

At step 308, the process queries whether the data is from a software specific body scanner file. If yes, as shown at step 310, then the apparel patternmaking application 128 may run analysis and store conditional results (step 312). At step 314, the apparel patternmaking application 128 may store the data and calculated data. Each client data set contains three elements, in a non-limiting embodiment. The first embodiment may include an original entry, a calculated measurement chart, and analysis results. The calculated measurement chart may calculate many of the missing fields that non-scanner data (hand measuring technique) cannot measure. The list of answers provided by the analysis results may provide answers to body proportion questions, such as if the bust size is greater than the waist size for a client, then a specific outcome or result is applied to a pattern. At step 316, if the answer is no and there is no body scanner file, then the apparel patternmaking application 128 queries whether there are any empty measurement fields (step 318). At step 322, if the answer is yes, then the apparel patternmaking application 128 uses built-in mathematical formulas to calculate any empty measurement fields (step 324). At step 326, the apparel patternmaking application 128 queries whether all fields can be calculated. At step 330, if the answer is no, then the apparel patternmaking application 128 requests further input. If the answer is yes at step 328, then the process includes running an analysis and storing if/else conditional results at step 312 and storing the data and calculated data at step 314.

With respect to step 320, if the answer to the query posed at step 318 whether there are any empty measurement fields is no, then the process also routes to running an analysis and storing if/else conditional results at step 312 and storing the data and calculated data at step 314.

The step 306 may allow a user to enter any measurement sets that are less than complete in comparison with body scanner data. Usually, body scanner data includes measurements that cannot be measured by hand.

Figure 9:
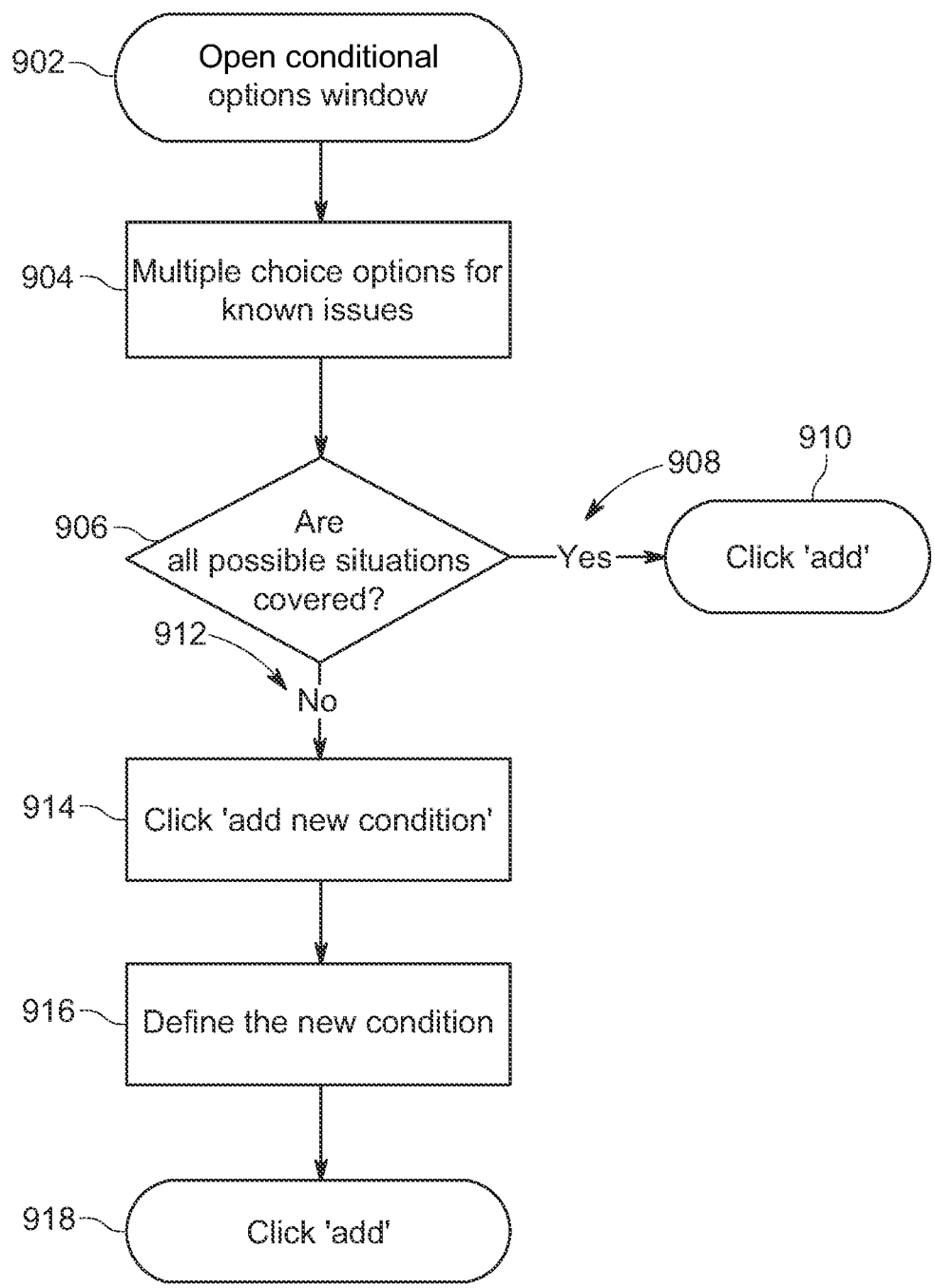
FIG. 9 depicts an exemplary flowchart for defining conditional options for a framework for a sloper.

Turning to FIG. 4, FIG. 4 is a pictorial illustration of a measurement interface 402, such as measurement interface 402, that may be a part of apparel patternmaking application 128. The measurement interface 402 shown in FIG. 4 may be used at step 202 shown in FIG. 2 to receive base measurements. Base measurements may be used for visual reference to build and make any changes to a final design for a pattern or a set of related patterns. These base measurements may be changed at any time or default values may alternatively be used. The default values may include ASTM based measurements or other measurements obtained from more accurate measurements that do not rely only on proportional sizing measurements such as that used by ASTM. The default values provide three different body shape examples so that it is easy to visually see how the pattern will appear in different situations. FIG. 4 shows that the measurement interface 402 may allow the user to enter a first or primary measurement set or view 404. The first or primary measurement set or view 404 may include user measurements for shoulder width 410, bust 412, waist 414, hip 416, and length 418 related measurements in a non-limiting embodiment. These measurements 410-418 may be reflected and displayed to the user in a portion 420 of the measurement interface 402 in a non-limiting embodiment. Additionally, in a non-limiting embodiment, in order to accommodate other body shape examples, either the user or another source may enter or calculate measurements for a second measurement view 406 and a third measurement view 408, which may have respective displays 422 and 424 also shown in measurement interface 402. FIG. 4 merely provides an example of how the interface 402 may appear. In one or more non-limiting embodiments, the user may possess all the data for measurement set A 420, measurement set B 422, and measurement set C 424 as shown in FIG. 4. In other cases, the user only possesses the data for the values for the shoulder width 410, bust 412, waist 414, hip 416, and length 418 for a particular measurement set (e.g., 420, 422, 424). It is noted that FIG. 4 usefully demonstrates that the apparel patternmaking application 128 can take the measurement values for various sizes and generate a digital sewing pattern 150 for the various sizes that is accurate due to the ability to calculate critical values using built in mathematical equations and logic, but also due to the conditional analysis 313 as shown in FIG. 3, in which a series of if/then conditional questions (e.g., as shown in FIGS. 9, 12, and 18) are asked. The results of those if/then questions are stored and then used to adjust a sloper 504, as shown in FIG. 5, to best suit a particular user's body and body proportions.

It is noted that the term "length" as used herein may refer to multiple lengths. The measurement interface 402 may provide cues for more specific types of measurements in addition to shoulder width 410, bust 412, waist 414, hip 416, and length 418 as shown in FIG. 4. For example, there may be additional entries for "side waist length", which is the distance from the mid-underarm point of the arms eye to the waist level, taken along the side of the torso (contour) or for the shoulder to elbow length, which is the distance from the top of the shoulder joint along the outside of the arm to the prominent point of the elbow, taken with the arm bent. These are exemplary length measurements 418 that may be provided and there are many other types of measurements that may be added including, but not limited to, the height of the user. The measurements fields shown in FIG. 4 are non-limiting, as the type of article of clothing that the user is preparing a digital sewing pattern 150 using the apparel pattern making software application 128 dictates the measurements required. Many other types of cues can be provided as well as definitions for a specific type of measurement field requested in a measurement interface 402. In a non-limiting embodiment, the user may first indicate a type of article of clothing that the user intends to create a digital sewing pattern 150 for and then a list of useful measurement fields may be listed out and defined so that the user can obtain those specific useful measurements as prompted or cued by the measurement interface 402 for a specific type of sloper 504 and/or article of clothing.

Figure 5:
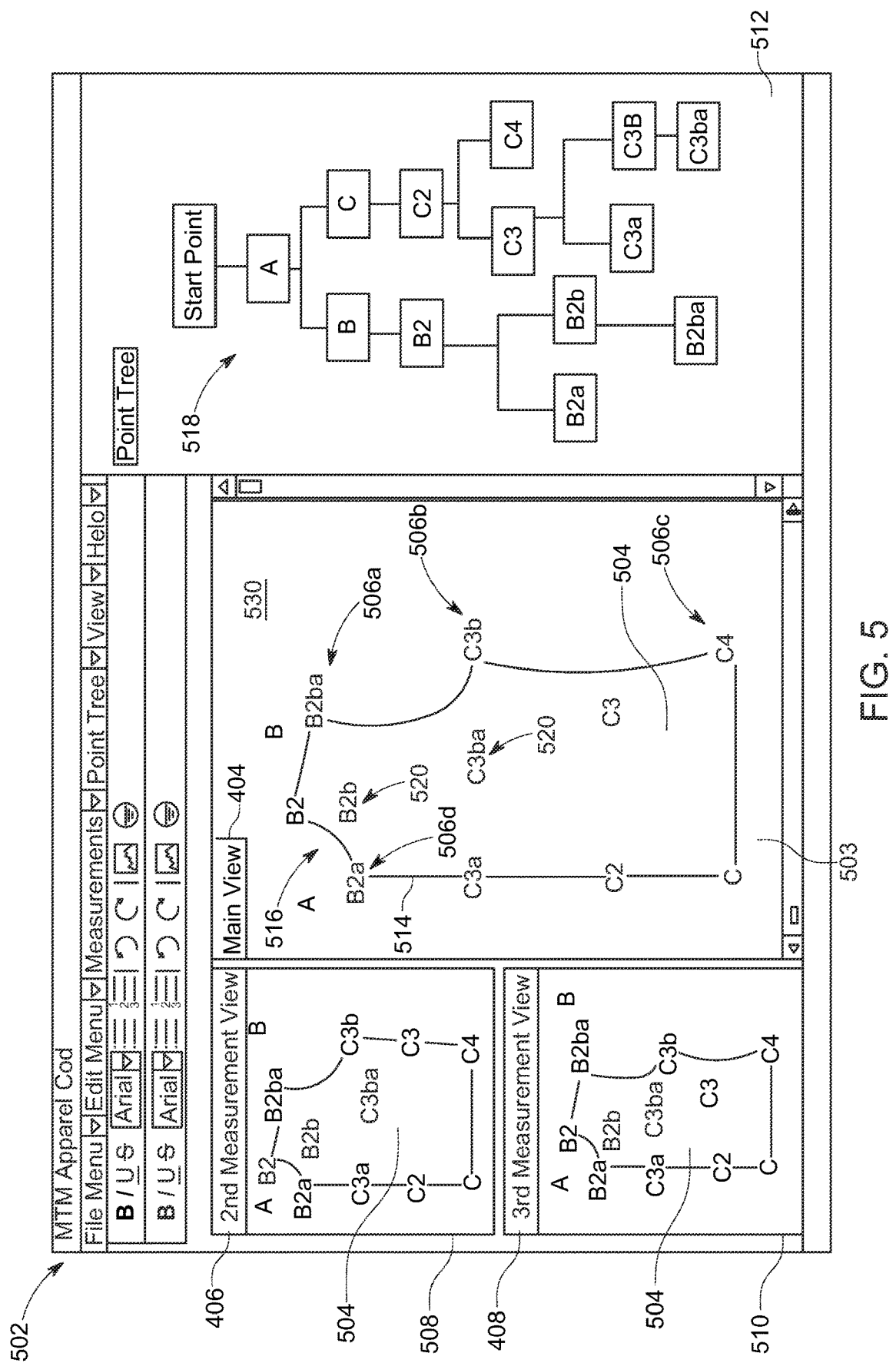
FIG. 5 depicts an exemplary interface illustrating an exemplary sloper or pattern that may be illustrated having the three sets of base measurements shown in FIG. 4 and an exemplary framework of the points illustrated for each set of base measurements.

FIG. 5 shows an example pictorial illustration of a sloper interface 502 provided by apparel patternmaking application 128 that can display three different examples of a sloper 504 for a specific type of garment or article of clothing. As noted above, the user may first select the desired sloper 504 from a database having a variety of templates included with the apparel patternmaking application 128.

The sloper or sloper base 504 shown in sloper interface 502 may reflect the measurements provided for the primary measurement set or view 404, the second measurement set or view 406, and the third measurement set or view 408. Each sloper 504 may be displayed to the user (e.g., on the user's computing device 100 shown in FIG. 1B) in the display segments 503, 508, and 510 of the sloper interface 502 for the primary measurement set 404, second measurement set 406, and third measurement set 408. Accordingly, in the example view shown in FIG. 5, there are three copies of three different size views for a sloper 504 pattern for a style or design of apparel. While FIG. 5 shows the sloper 504 adjusted to accommodate three different sets of measurements 404, 406, 408 provided to the apparel patternmaking application 128, in some cases, the apparel patternmaking application 128 may only receive one set of measurements representing one body type of an intended wearer, in which case only one view would be presented with the sloper 504. The user can then subsequently provide other sets of measurements having different values and the apparel patternmaking application 128 may automatically modify and edit the sloper 504 based on the updated set of measurements reflecting a different size and body proportion. In a non-limiting embodiment, the apparel patternmaking application 128 automatically modifies and edits the sloper 504 after evaluating which design changes to make to the sloper 504 to best suit the body type of the wearer as evaluated based on the provided set of measurements and how those measurements comply with the conditional results (e.g., conditional results 312 shown in FIG. 3) included in the apparel patternmaking application 128.

Each sloper 504 may be an assembly of anchor points 506, such as anchor points 506a-506c, connecting lines 514, and curves 516 that make up the design of each sloper 504. Notably, each anchor point 506 is labeled. For example, as shown in FIG. 5, in a non-limiting embodiment, each anchor point 506 is labeled in alphanumeric order and by type. However, it is noted that the apparel patternmaking application 128 permits the user to alter the labels to suit the preferences of the user and to customize the labels of the anchor points 506. Other labels may be used other than alphanumeric labels for the anchor points 506.

Some anchor points 506 correspond to control points 520 that can be used to control the curves 516 on a sloper 504. The control points 520 correspond to the curve created between one or more points. For example, the anchor point labeled as C3ba is a control point 520 that can be used to control the parametrization of the curve that corresponds to the curve formed between point B2ba ad C3b. Further, the anchor point B2b is also a control point 520 used to control and corresponds to the curve shown in FIG. 5 between anchor point labeled B2 and the anchor point labeled B2a. In a non-limiting embodiment, the apparel patternmaking application 128 allows the user to select a control point 520 for a curve on a sloper 504 and drag the control point 520 in a forward, back, up, or down direction to see the affect on the sloper 504 as a whole and the effect on the curve.

Ultimately, the total combination of anchor points 506, lines 514, and curves 516 form the sloper pattern 504 that can be used to cut and sew fabric or other material to form an article of clothing. The connecting lines 514 and curves 516 are examples of connecting objects included in a sloper 504 that may be used to create the design of the overall object or set of objects for the sloper 504.

In a non-limiting embodiment, an object, as used and defined herein, is an individual piece of a digital sewing pattern. The digital sewing pattern may comprise multiple objects to form the whole digital sewing pattern for an article of clothing. For example, if the digital sewing pattern corresponds to a jacket, there may be 60 objects that make up the sloper and that will then make up the finalized digital sewing pattern that is based off of the sloper. This may be due to the fact that there are multiple components that make up the jacket, such as, but not limited to, the inner lining, outer jacket material, collar, sleeves, etc., which is why there may be multiple objects that can be edited and organized or arranged together to make up the whole sloper for a finalized digital sewing pattern.

Additionally, another segment 512 of the sloper interface 502 in a non-limiting embodiment may display a framework tree 518 that displays the connection of each anchor point 506 to another so that it is clear to the user where the connecting lines 514 and curves 516 or other types of connecting objects of the sloper pattern 504 connect. The slopers 504 are basic building blocks that can be edited to create a final design for the digital sewing pattern. Each of the sloper base files contains the framework of calculations that will build the basis for a style or design for an article of clothing that can be made from the digital sewing pattern produced by the apparel patternmaking application 128. In a non-limiting embodiment, the framework tree 518 for each sloper 504 can be locked by default to prevent accidental user editing. The default can be turned off if the user chooses to do so. Each sloper 504 file may contain connecting objects made up of lines 514 or curves 516 or other geometrical elements that connect between the anchor points 506 shown on the sloper interface 502 of the apparel patternmaking application 128. The other geometrical elements may include a wide variety of other geometrical shapes and elements including, providing rectangles, crosses, circles, or other shapes.

Notably, the apparel patternmaking application 128 can provide the user with the point tree or framework tree 518, as shown in the non-limiting example in FIG. 5, as the base upon which to plot anchor points 506 and draw the sloper 504. In a non-limiting embodiment, the user can manipulate or move the connecting lines 514 and curves 516 or other geometrical elements that make up the connection objects on a display screen of the user's computing device 100 as well as the anchor points 506, which is different from any existing software applications that may be used to create patterns.

Figure 6:
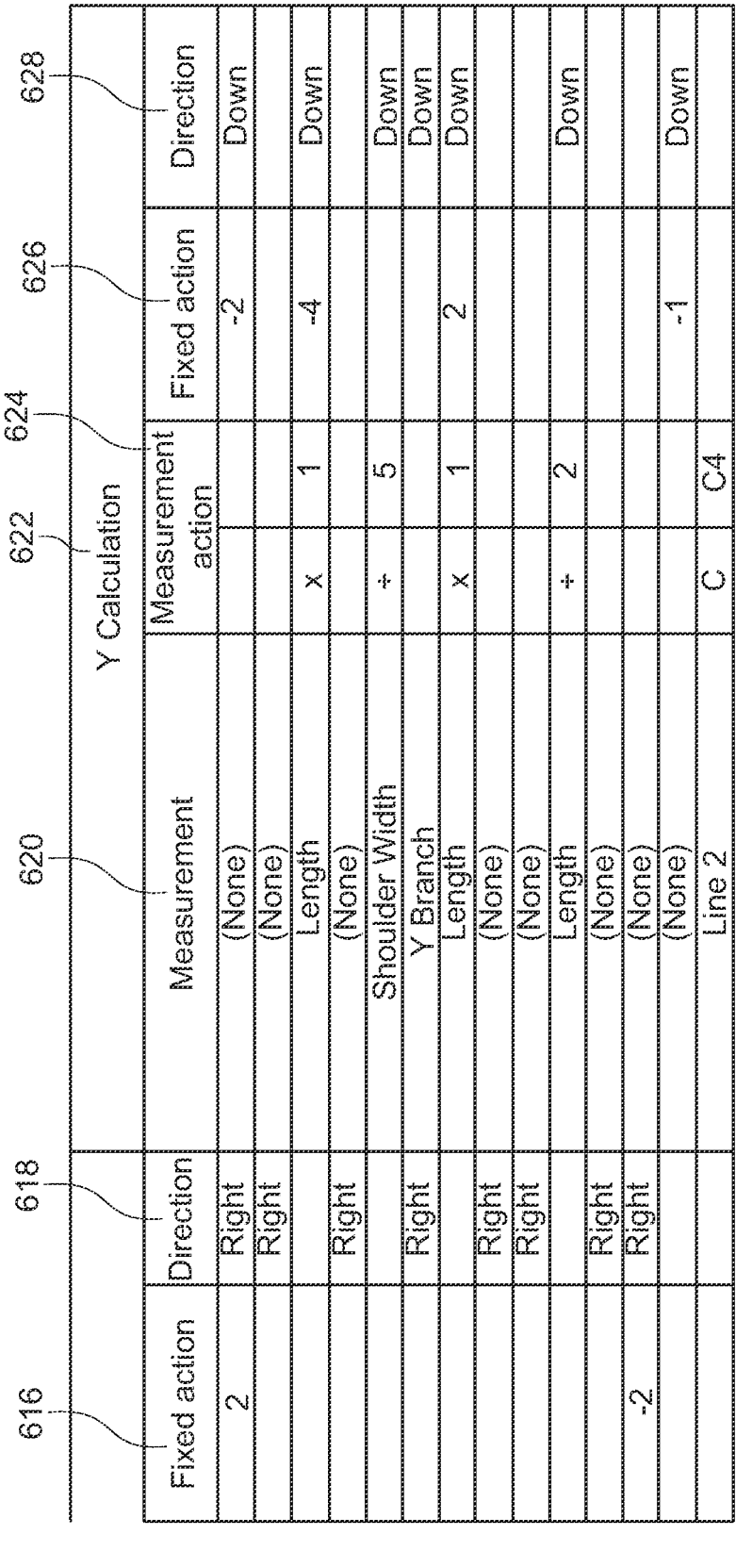
FIG. 6 depicts a table with exemplary connections between points on an X-Y plane.

FIG. 6 provides an exemplary table 600 showing the components of the framework tree 518 from the example shown in FIG. 5 and the anchor points 506 as they are laid out on a display canvas 530. The exemplary table 600 shown in FIG. 6 shows the anchor points 506, connecting lines 514, and curves 516 shown in FIG. 5, and other types of connecting objects in list format. The table 600 shown in FIG. 6 is a simplified example. Most sloper frameworks have over 100 lines and more before any edits are added. The framework tree 518, as shown in an example in FIG. 5, can make it easier to follow each anchor point 506 back to where its root point is because of the way the framework tree 518 is laid out.

Figure 22:
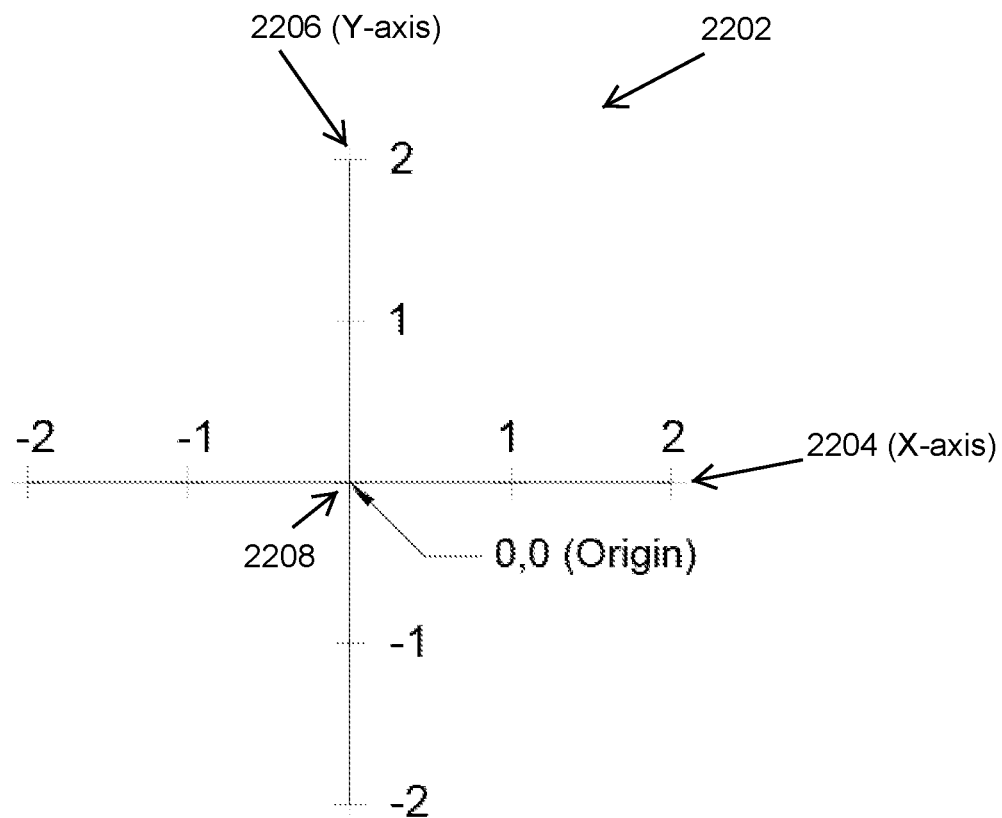
FIG. 22 depicts an example of a partial X-Y grid.

Apparel patternmaking application 128 uses an X-Y grid, such as X-Y grid 2202 shown in FIG. 22. The X-Y grid 2202 shows a partial example of a Cartesian coordinate grid having an X axis 2204 and a Y axis 2206 and a center point (0,0) 2208. The apparel patternmaker application 128 is configured to plot anchor points 506 in an X direction along X axis 2204 (whether in a positive or negative direction) from a center point (0,0) 2208 of the X-Y grid 2202 and to plot anchor points 506 in a Y direction (whether in a positive or negative direction) from the center point 2208 of the X-Y grid 2202. When the user and/or the apparel patternmaking application 128 moves or places an anchor point 506 along the X direction 2204, the user may be creating points in a horizontal direction to design the pattern for the shoulder or hip or waist, for example without limitation thereto, of the garment. When the user and/or the apparel patternmaking application 128 moves or places an anchor point 506 along the Y direction 2206, the user may be designing the vertical connection lines and curves elements of the pattern in another non-limiting example. In a non-limiting embodiment, the measurements obtained by the apparel patternmaking application 128 (e.g., as shown in FIG. 4) from the user (which may have been provided by a body scanner and/or manually measured for an intended wearer) may be related to the set of labeled anchor points 506 plotted along the X-Y grid 2202 included with the apparel patternmaking application 128 and connecting objects connecting the anchor points 506. In a non-limiting embodiment, the user is able to create and add anchor points 506 to an existing template for a sloper 504.

FIG. 6 shows an example of a table 600 that may be accessible to a user using apparel patternmaking application 128. In a non-limiting embodiment, a first column of the table 600 may include the label and/or name 602 of each anchor point 506 shown in the sloper 504. As shown for example in the label column 602, the labels of the anchor points 506 are provided in alphanumeric order. As noted above, in other non-limiting embodiments, the user can provide other types of names and/or labels for the anchor points 506. At the column 604, table 600 shows a listing of the exact X-Y location of each anchor point 506 as plotted on an X-Y grid, such as X-Y grid 2202 shown in FIG. 22 and plotted based on a negative or positive direction on an X axis 2204 (with respect to the center point 2208 of the grid 2202) and plotted based on a negative or positive direction on the Y axis 2206. For example, as shown in FIG. 6, the table 600 shows that the anchor point 506 A has an X-location on the X axis 2204 of "2" on grid 2202 and a Y-location on the Y axis 2206.

Further, the table 600 includes a column for the point type 606. The point type 606 may list the type of anchor point 506. The anchor points 506 may be listed as coordinates, lines, rectangles, line cross, compass cross, compass distance, or distance, in one or more non-limiting embodiments, with many additional types and varieties of mathematical/geometrical descriptions to describe the purpose or type of anchor point 506 as used in a sloper 504.

The table 600 includes a column 608 showing a listing of the related point as for example shown also on the framework tree 518 shown in FIG. 5. In this manner, the apparel patternmaking application 128 is able to determine how each anchor point 506 relates to the other. For example, as shown in the table 600 in FIG. 6, anchor point B2*b* is listed as relating to anchor point B2, which as shown on the sloper 506, anchor point B2*b* is a control point to control the curve formed between B2*b* and B2*a*. Accordingly, the table 600 helpfully provides the anchor points 506 and also how these anchor points 506 relate to each other. The table 600 further includes a section indicating the calculations used to create the X location of each anchor point 506 on a sloper 504. As shown in FIG. 6, 610 corresponds to all the pertinent information for an X calculation. The table 600 includes a measurement column 612 listing which measurement value or field that the anchor point 506 relates to or corresponds to. The measurement values are obtained from the user in the form of manually measured measurements and/or imported data or provided from a body scanner (e.g., as noted at step 306 in FIG. 3). For example, as shown in FIG. 6, anchor point B, as shown in the table 600, relates to the shoulder width measurement as provided from one or more sources. Accordingly, the table 600 and the apparel patternmaking application 128 can track and note which measurement sets relate to each anchor point 506 of a sloper 504. As noted above, the sloper 506 takes each measurement field and correlates the measurement to the plotted anchor points 506 on the display canvas 530 of the interface of the apparel patternmaking application 128. Further, the table 600 provides column 614, which corresponds to the measurement action taken in an X direction on an X axis 2204 of the X-Y grid 2202. For example, the measurement action column 614 of the table 600 indicates whether an action is taken if any along the x direction of the X-axis 2204, as is the case for anchor points A, B, B2, C3, C4, C3*b*, and C3*ba*, as shown in table 600 in FIG. 6. Further, column 616 corresponds to any fixed action taken, while column 618 shows the direction moved along the X axis 2204 of the X-Y grid 2202.

The table 600 further includes a section indicating the calculations used to create the Y location of each anchor point 506 on a sloper 504. As shown in FIG. 6, 622 corresponds to all the pertinent information for a Y calculation. The measurement column 620 lists the measurement sets/fields that correspond to each anchor point 506. The column 624 relates to and lists the measurement actions and calculation used to create the Y location of each anchor point 506 on a sloper 504. Column 626 provides a listing of any fixed action taken, while the direction column 628 lists the direction moved along the Y axis 2206 of the X-Y grid 2202. FIG. 21 shows a table 2100 having the same types of columns and categorizations 602-628 as shown in FIG. 6. The table 2100 provides exemplary data related to the images for the curves shown in FIG. 19 and FIG. 20, but still utilizes the same arrangement of columns 602-628 as table 600 shown in FIG. 6.

Notably, a sloper 504 may have hundreds of anchor points 506 and it is very helpful that the apparel patternmaking application 128 provides interfaces, such as table 600 and table 2100 to show the user the listing of anchor points 506, their label names as shown in column 602, and how they are plotted and arranged on an X-Y grid 2200 and which direction on an X axis 2204 and a Y axis 2206. The apparel patternmaking application 128 organizes and manipulates the anchor points 506 of each sloper 504 according to the X-Y grid 2200. Further, the apparel patternmaking application 128 correlates and corresponds measurement values provided and inputted or entered into the apparel patternmaking application 128 by the user to the anchor points 506.

Figure 7:
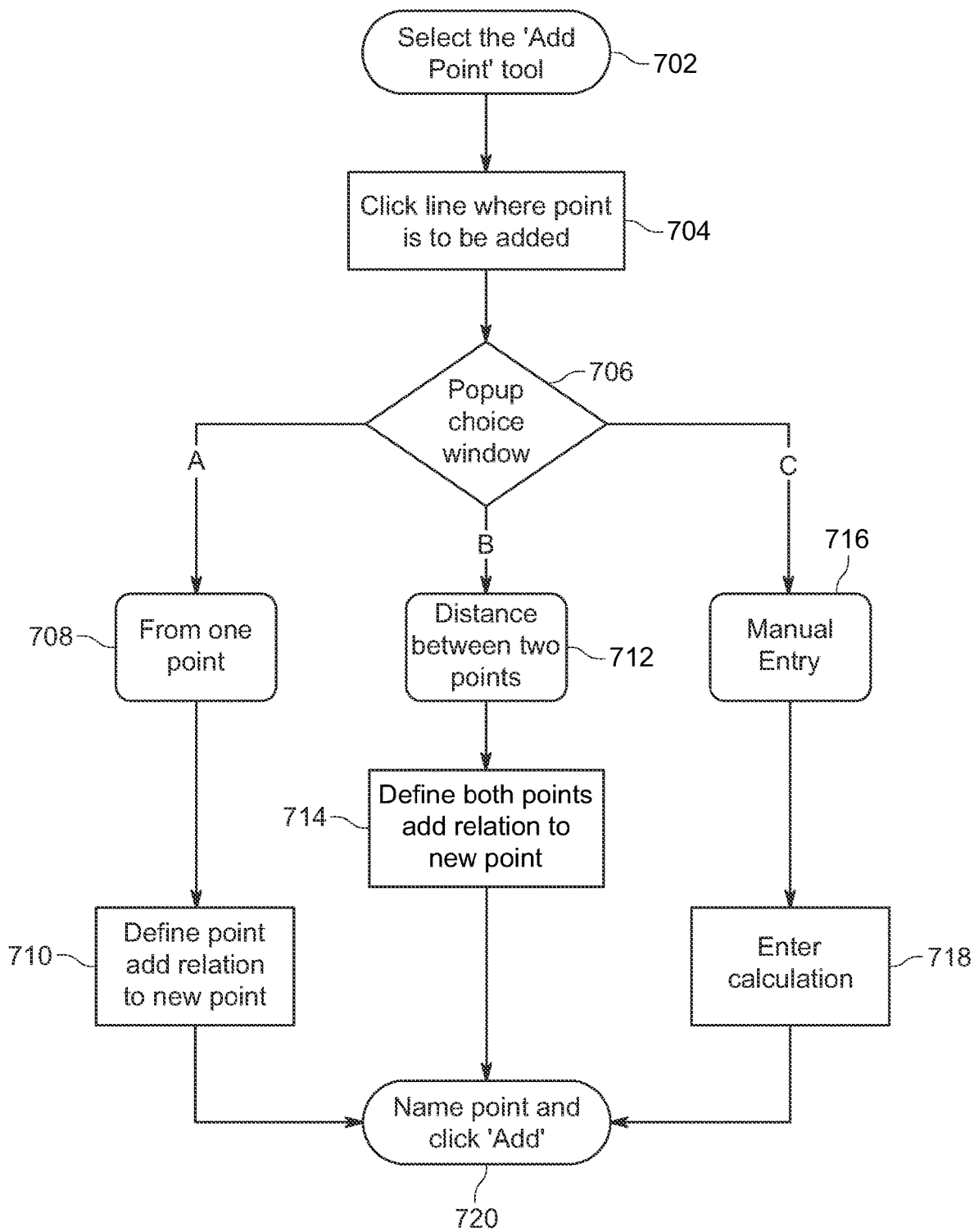
FIG. 7 depicts an exemplary flowchart for adding points to a sloper.

FIG. 7 shows an exemplary flowchart for adding points or anchor points 506 to the framework tree 518 and defining how the anchor points 506 attach, which is an integral and important part of the process used by the apparel patternmaking application 128 to produce digital sewing patterns 150 for apparel. FIG. 2 includes a step 210 for the apparel patternmaking application 128 to process instructions to create a design from a sloper 504 using points 506 and connecting objects (e.g., connecting lines 514 and curves 516). This step 210 as shown in FIG. 2 may incorporate some or all of the steps shown in FIG. 7 in a non-limiting embodiment.

At step 702, the process may include selecting an "Add point" tool. At step 704, the user may click on the line 514 or curve 516 where the point is to be added. At step 706, the user is presented with a popup choice window and several options. At step 708, the user may be provided with an option to add a point based on one other existing point. At step 710, the user may be provided with an option to add a point by defining the point and the relation to the new point. At step 712, the user may be provided with an option to select a point based on the distance between two points. At step 714, the user may be provided with an option to define both points and the relation to the new point. At step 716, the user may enter the points via manual entry. At step 718, the user may enter a calculation to determine the points. At step 720, the user may name the point and click "Add" to add the new point to a sloper 504 using apparel patternmaking application 128.

With the apparel patternmaking application 128, pattern pieces or slopers 504 may be drawn as paths between anchor points 506 whose location is defined by the point tree 518, as shown in FIG. 5, and the measurement calculations that place them. Clicking on these points 506 will show how and why the anchor points 506 are placed where they are. Further, the location of any point 506 in the sloper pattern 504 can be changed by changing the how and why, thus keeping the pieces connected to the initial drawing rules and conditions. This connection between the points 506 may allow the made to measure function to resize existing sloper patterns 504 with relative ease in comparison with existing conventional options that require much more extensive patternmaking skills and knowledge. As noted above, most existing software applications do not allow a user to edit the base pattern piece once it is made. Often times, the user has to start from scratch to adjust measurements for another size or accommodate a variation in design or manually move points already placed on a display canvas in these conventional applications.

Figure 8:
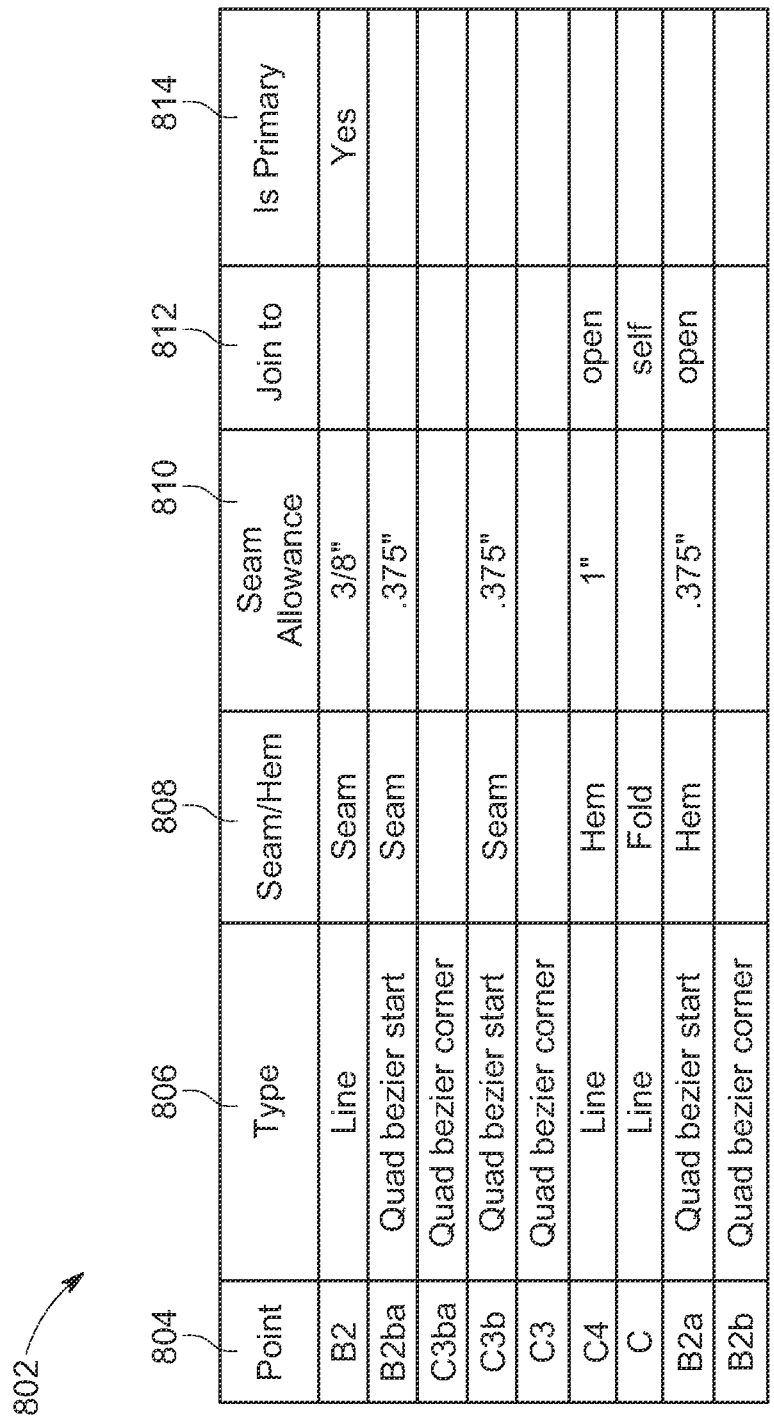
FIG. 8 depicts an exemplary table or chart illustrating values and data for key features of an object.

FIG. 8 shows an example table 802 that may be displayed in one or more interfaces of apparel patternmaking application 128 to the user. Table 802 may include several columns, shown as columns 804-814 that relate respectively to point 804, type 806, seam/hem 808, seam allowance 810, joins to 812, and "is primary" 814. In a non-limiting embodiment, point 804 relates to the point to connect to. Type 806 refers to what kind of line to draw, including straight lines 514 and curves 516, which may include, but are not limited to, any type of Bezier curves. Notably, the apparel patternmaking application 128 includes and can perform a variety of complex mathematical formulas, equations, and calculation techniques, including, but not limited to Bezier curves as shown for example in FIG. 8.

It is noted that multiple types of mathematical formulas and equations may be included or built into the apparel patternmaking application 128 to calculate the positioning of each anchor point (e.g., anchor point 506 as shown in FIG. 5), the positioning and connection of each connecting object, and also to calculate how any curves or lines should appear on the sloper 504 for any seams or hems or folds. A hem is an edge of a piece or clothing which has been turned under and sewn. A seam is a joint where two or more layers of fabric or other materials that are held together with stitches. A fold line refers to where a sloper 506 may be folded and is useful to know in terms of how to cut the final digital sewing pattern 150 or arrange all of the assembled objects of the final digital sewing pattern 150. A seam allowance refers to the area between the stitching and raw, cut edge of the fabric. The seam allowance is an important part of a seam, and is usually unseen, inside the garment.

Advantageously, and uniquely, apparel patternmaking application 128 provides a table 802 that can be displayed on an interface of the apparel patternmaking application 128 that lays out whether a line, curve, or other type of geometrical element, as indicated for example in type column 806, is associated with a seam, a hem or a fold.

Seam/Hem 808 defines whether the line 514 or curve 516 will connect to another form or another object or not. Seam Allowance 810 refers to how much extra fabric or other material may be need around the edges for sewing purposes. Seam Allowance 810 is empty by default, in a non-limiting embodiment, and can be filled optionally by the user. "Joins to" 812 defines which points, and therefore which line/curve, from another object the line will join to.

In a non-limiting embodiment, the apparel patternmaking application 128 may divide lines into categories of primary and non-primary. For the "Is Primary" 814 column of the object table 802, primary lines cannot adjust in length. Non-Primary lines self-adjust to match primary ones. The user can define which point to move to make the seams match. In most cases, adjustments are made in small amounts.

FIG. 9 shows an exemplary flowchart for defining if/else conditions that may be used to determine a sloper 504. Conditional options, as described in the present description, relates to if/else clauses or statements which may be used to change how the framework is formed in certain situations where the if/else clause is determined to be true or false. These situations may be defined in the measurement analysis results and can be added to at any time if needed. As further described below, FIG. 12 provides an example interface 1202 for a conditions interface for specifying the situations of interest to the user.

As shown in FIG. 9, at step 902, the apparel patternmaking application 128 may open the conditional options window. In a non-limiting embodiment, these conditions are required for all files by default, but can be disabled by user choice. At step 904, the user is presented with multiple design choice options for known issues. This window will also open automatically should calculation errors occur with a set of measurements. This is one of the reasons for the control measurement views shown in FIG. 3 and FIG. 4. These views may allow the user to see how the pattern behaves with different sets of measurements.

At step 906, the apparel patternmaking application 128 queries whether all possible situations are covered. If yes, as shown at step 908, then the user may add additional situations where if/else clauses and conditions are needed at step 910. At step 912, if the answer to the query presented at 906 is no, then the user may add new conditions 914. At step 916, the user may define the new condition and add this new condition to the apparel patternmaking application 128 at step 918. In a non-limiting embodiment, in the case of an error, the error window may be presented to the user and indicate which calculation failed. Further, the apparel patternmaking application 128 may present this window to the user to enter a condition that will correct this issue. It is noted that large adjustments may automatically trigger a calculation error and open the conditional options window in a non-limiting embodiment in order for a user to select or create an option with a preferred design detail or change to correct the error.

In some cases, there may be predefined errors where certain measurements cause the sloper 504 to move a point the wrong way or an angle in a wrong direction making a pattern shape that has lines that cross over each other instead of making a nice shape. For example, in other instances, it is possible that a line cross calculates the point where two lines cross finds two lines that happen to not intersect at all. If such an event were to occur, then the conditional options or conditional results window may pop up and ask a user for a design detail correction and/or provide suggested design detail corrections or extra conditions.

Figure 10:
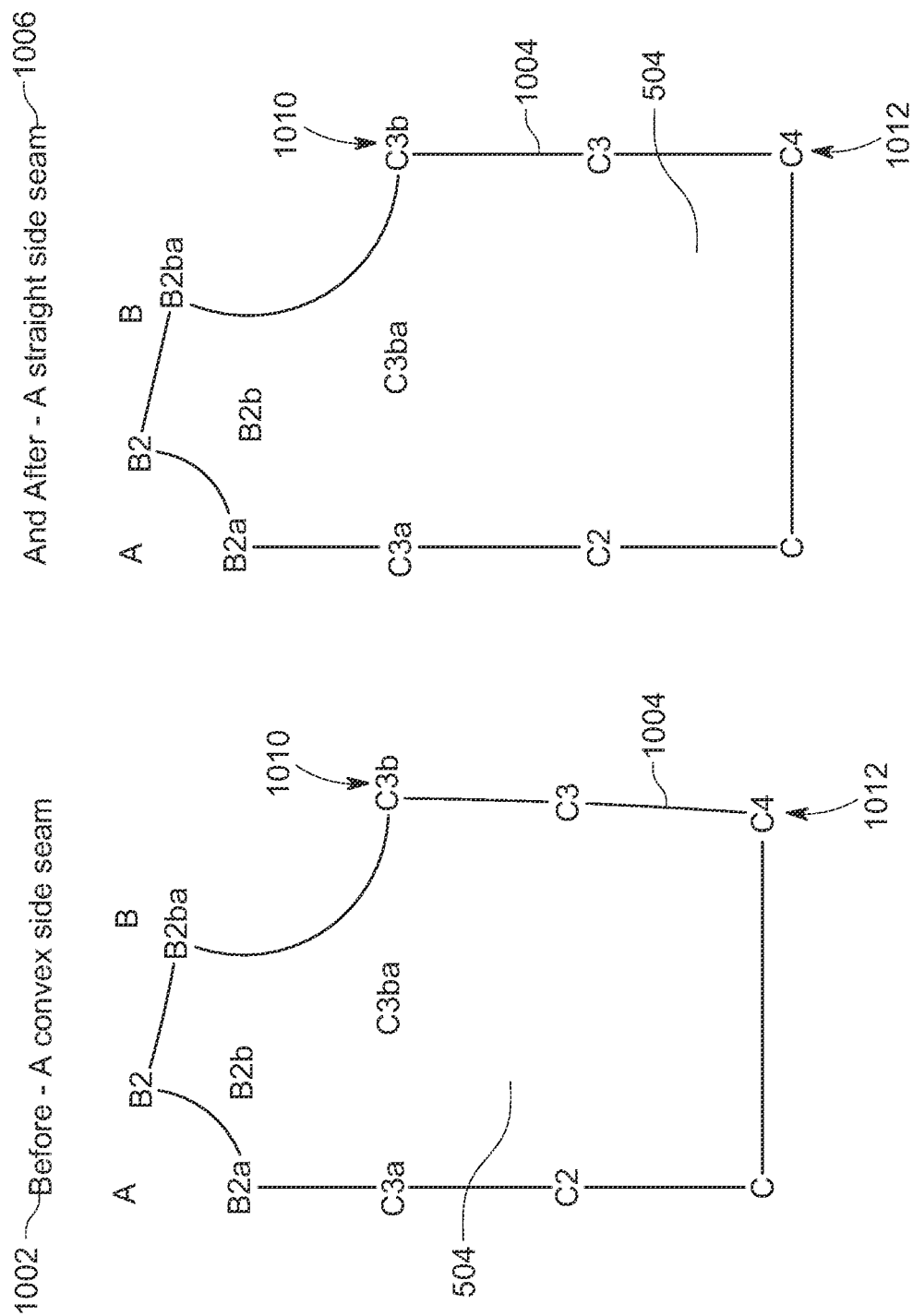
FIG. 10 depicts an exemplary sloper that is edited using the apparel pattern making application using conditions to make the edits.

FIG. 10 shows an example sloper 504 that incorporates the second measurement set 406 shown in FIG. 4. In this case, the analysis portion of the apparel patternmaking application 128 may determine that the waist <bust measurement is false and then the waist<hip is also false. The condition that the user added to the apparel patternmaking application 128 states that "if waist <hip" then change hip to equal the waist. This condition causes the hip measurement to change from 46 to 48 because the waist is 48. FIG. 10 shows an example of before and after the conditional change. Interface 1002 may be an interface that is visible in apparel patternmaking application 128 showing before the conditional change in which there is a convex side seam extending from anchor point 1010 to anchor point 1012. Thus, the line 1004 connecting anchor point 1010 to anchor point 1012 is shown as a convex line. In the interface 1006 shown in FIG. 10, which shows after the conditional change is implemented by apparel patternmaking application 128, there is a straight side seam line 1004 between point 1010 and 1012. Thus, the design detail or change that can be included as a pre-defined default design detail when the waist <bust measurement is false and the waist<hip is also false is to adjust the hip measurement to make a straight side in order to fit the body shape where the waist is not greater than the bust (waist>bust=false) and waist measurement is not greater than the hip measurement (waist<hip=false). In other instances, the user can enter this as a design detail, change, or outcome if it is not a listed pre-defined option or default.

Figure 11:
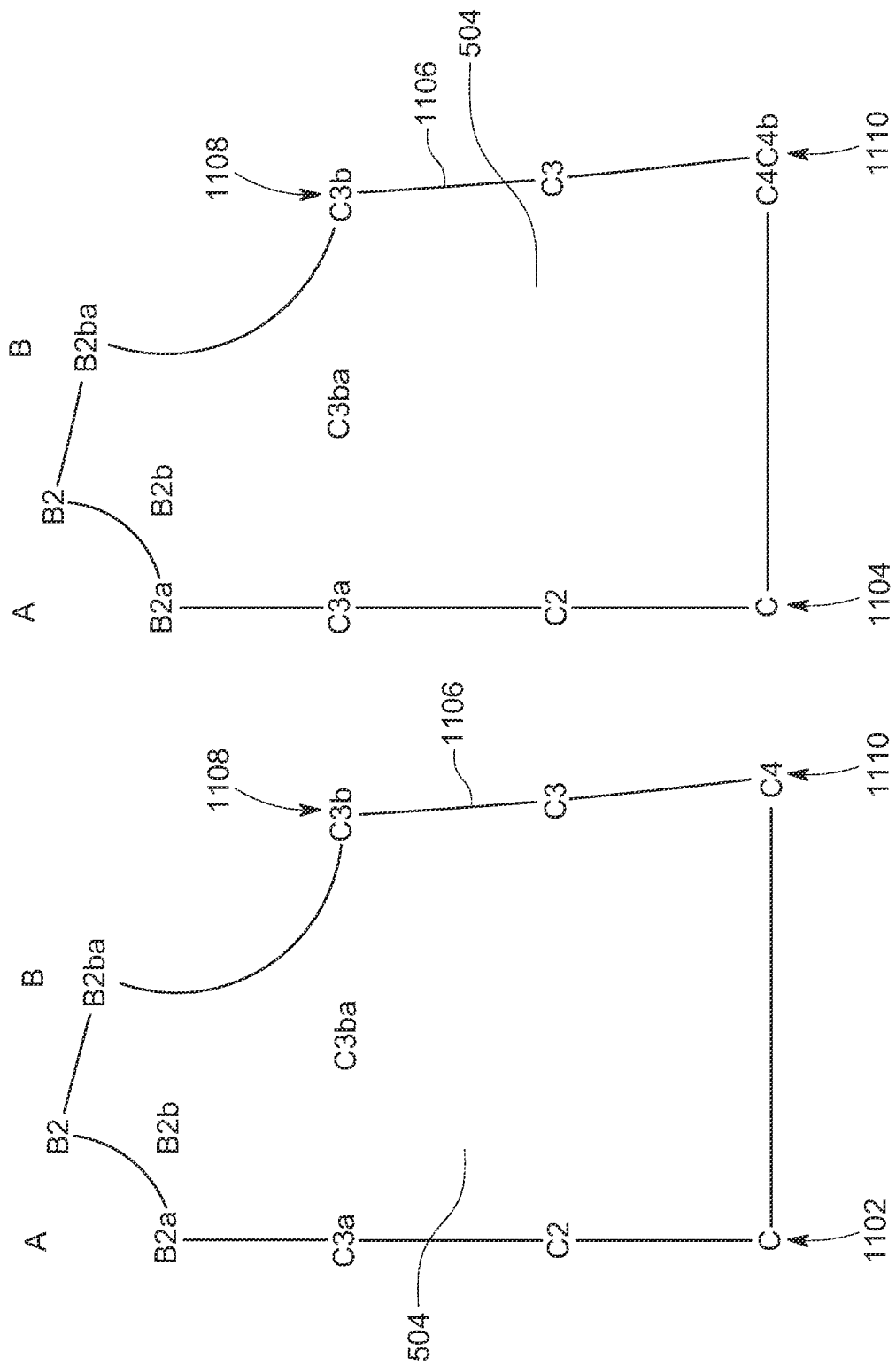
FIG. 11 depicts the exemplary sloper shown in FIG. 10 that is edited in another manner.

FIG. 11 shows another example of how conditional design changes or outcomes may affect the design of the sloper pattern 504. In the example shown in FIG. 11, the bust measurement for a user may be 46 and the waist measurement may be 48. In this case waist<bust=false and waist>bust=true. The personal choice of the user and/or the predefined, default option provided in the apparel patternmaking application 128 may be to keep the bust and make the line 1106 or side seam extend outwardly by adding a new control point 1110 (e.g., new control point C4b as shown in interface 1104 in FIG. 11). Thus, interface 1102 shows the side seam 1106 connecting point 1108 and 1110 before the adjustment is made to the sloper 504 based on a newly added conditional statement and interface 1104 shows the side seam 1106 adjusted after the analysis is performed by the apparel patternmaking application 128 implementing any if/else clauses and conditional statements.

FIG. 12 shows an example interface 1202 for setting up the conditional clause (e.g., if/else clauses) in apparel patternmaking application 128 to determine how adjustments should be made to a sloper pattern 504 that are based on either default adjustments to a sloper pattern 504 when certain conditions are met or adjustments or outcomes as set by a user based on the user's design choices and personal preferences. For example, interface 1202 shows an initial condition clause 1204 may ask the user to select if a first measurement 1210, is either greater than, smaller than, equal to, or relates in another way with respect to a second measurement 1206, then the user defines what to do with this option. The interface 1202 may allow the user to set up any number of such conditional clauses 1204. As shown in FIG. 12, there are if/then clauses and else if clauses that allow the user to specify or define a preferred outcome, when one measurement is either greater than, less than, equal to, or relates in another way to another type of measurement.

Accordingly, in a non-limiting embodiment, the patternmaking application 128 provides a conditional results interface or window, such as that shown in FIG. 12 and/or FIG. 18. These conditional results windows use if/then statements and true/false fields, in one or more non-limiting embodiments, where a first measurement 1210, as shown in FIG. 12, is greater than or less than or equal to, or another type of mathematical comparison choice, a second measurement 1206. In a non-limiting embodiment, either the apparel patternmaking application 128 provides the user with options to select from in a field such as 1208 or allows the user to choose or define how a design change should be implemented on a sloper 504. Accordingly, while the user may still have to have some level of understanding about patternmaking and how clothes fit and are tailored, the apparel patternmaking application 128 assists the user to prepare a sloper pattern 504 that will become a finalized digital sewing pattern 150 by prompting the user to consider certain body proportion issues and what is the preferred design choice to handle such body proportion issues. In a non-limiting embodiment, the conditional results windows or interface, and the if/then statements are useful for addressing not just how measurements are plotted to anchor points 506 on a sloper 504, but also what design details or changes should be made to a sloper 504 to best fit an intended wearer who has or is presumed to have certain body measurements. As noted above, the apparel patternmaking application 128 is intended to provide made to measure digital sewing patterns 150 that provide made to measure articles of clothing that fit the form and shape of an intended wearer as closely as possible.

The conditional options window 1202 as shown in an example in FIG. 12 has no limit, in one or more non-limiting embodiments, and can allow one condition to trigger more than one adjustment. Further, in some instances, one condition can trigger a section of the framework tree or point tree 518 shown in FIG. 5 to be entirely replaced by a modification. This would then in turn, modify the anchor points 506 used for the related connecting object.

Once the sloper 504 has been created for the various sizes and approved by the user, the apparel or clothing item can be made based off of the digital sewing pattern 150 without having to necessarily begin again from scratch. Notably, any articles of clothing produced from the digital sewing pattern 150 has a better fit for an intended wearer than other generic articles of clothing because the sloper 504 used to create a finalized digital sewing pattern 150 includes the specific measurements of the wearer. Once the sloper 504 has been created having the correct style and matching the conditions for the if/else clause, there should not be an editing phase needed for made-to-measure production runs. In comparison, existing software applications for creating sloper patterns require a lot more time in the editing phase to properly edit a sloper 504. In particular, when the existing sloper 504 or previously created sloper 504 has be to be adjusted for a particular shape or size, these shape adjustments are performed manually and require extensive patternmaking skills.

In a non-limiting embodiment, once the digital sewing pattern 150 is finalized, the user may have a couple of options how to have the digital sewing pattern 150 utilized to create an article of clothing. In one non-limiting embodiment, the digital sewing pattern 150 may be printed on paper. In another non-limiting embodiment, the digital sewing pattern 150 may be sent to a digital cutting system. In another non-limiting embodiment, the digital sewing pattern 150 may be saved/exported as a .pdf file or saved/exported as a .dxf file.

As noted above, the digital sewing pattern 150 may be composed of a set of objects that present or relate to certain portions/pieces of the finalized digital sewing pattern 150. The user can have all the objects assembled as a whole when printing or exporting the digital sewing pattern 150 in one or more non-limiting embodiments. Alternatively, the user may individually print or export each object that makes up the finalized digital sewing pattern 150. In a non-limiting embodiment, the sloper (e.g., sloper 504 shown in FIG. 5) may be the template selected for a type or article of clothing while the digital sewing pattern 150 may relate to the finalized, edited version of the initial sloper.

In a non-limiting embodiment, the digital sewing pattern 150 can be used to create a marker. A marker relates to the layout of the pattern pieces that a factory or production facility would use. Markers are made and arranged in such a manner to use as little fabric as possible.

Turning to FIG. 13-FIG. 18, FIG. 13-18 help to relate some of the different body proportion issues that can affect how an article of clothing appears and the design considerations a designer or user of the apparel patternmaking application 128 has to take into account. Prior to the apparel patternmaking application 128, there was not an easy way to address the different body proportion issues that are shown in FIGS. 13-18.

FIG. 13 shows an example of a basic suit jacket 1300 without any modifications based on body proportion. The front view 1301 is shown for the basic suit jacket 1300 as well as the back view 1303. As shown in FIG. 13, there are three buttons 1304a, 1304b, and 1304c that are integrated into the suit jacket 1300 and aligned vertically. Further, the suit jacket also includes two waist darts shown as first waist dart 1306 and second waist dart 1308, as well as a first shoulder dart 1310 and a second should dart 1312 as shown on the back view 1303 of the suit jacket 1300.

Darts are used by dressmakers as a technique for shaping garments by curving straight fabric to the body. Darts are created by stitching a long, thin pinch to a point, which is then pressed down to one side. In other words, darts are two lines that are brought together to create the fold of fabric that is stitched. Darts usually have dart legs that are sewn from the widest point of the dart legs to the apex. Darts may be used and appear more often on the shoulders, waist, and bust of an article of clothing for shaping purposes.

Figure 14:
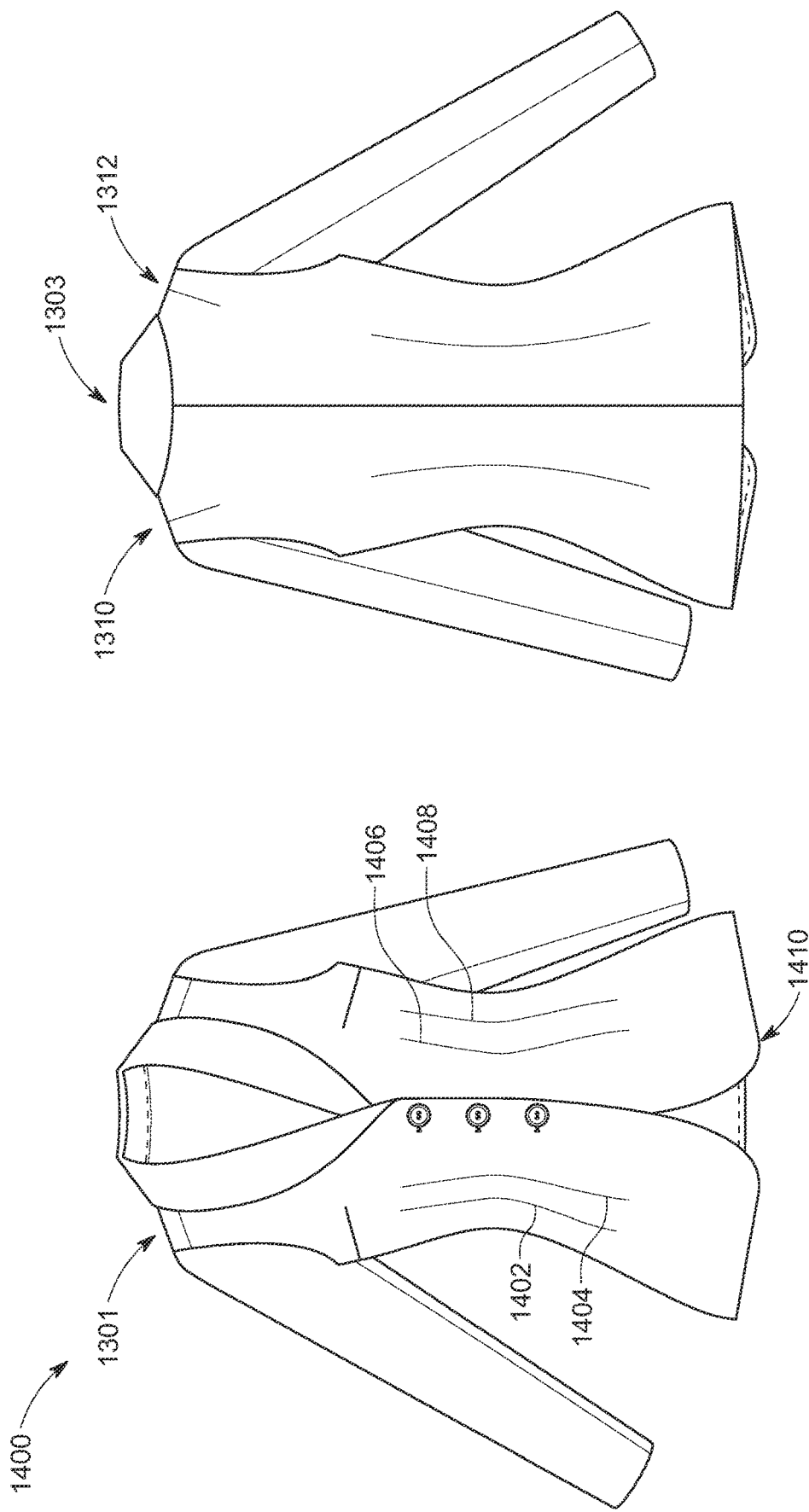
FIG. 14 depicts a pictorial illustration showing adjustments made to the base design shown in FIG. 13 based on a different set of measurements for a narrow waist and larger hip.
Figure 19:
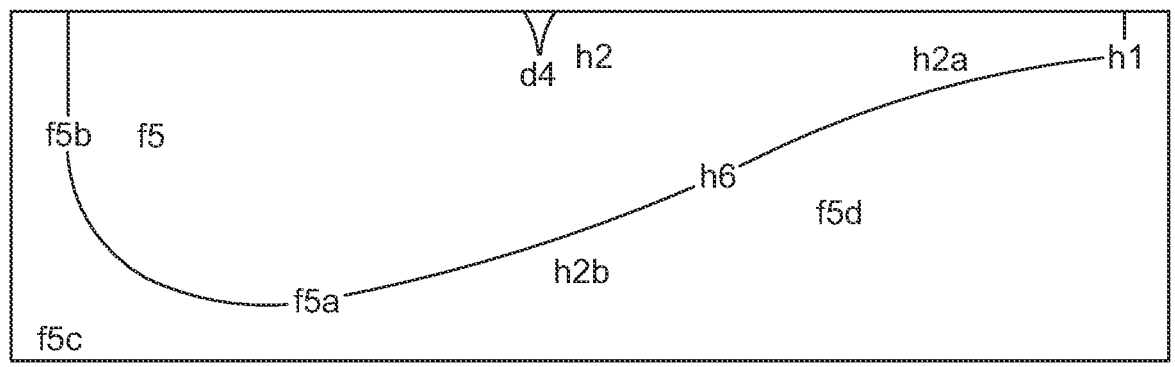
FIG. 19 depicts an example of a front hem for a sloper base for the case study shown in FIG. 13.
Figure 20:
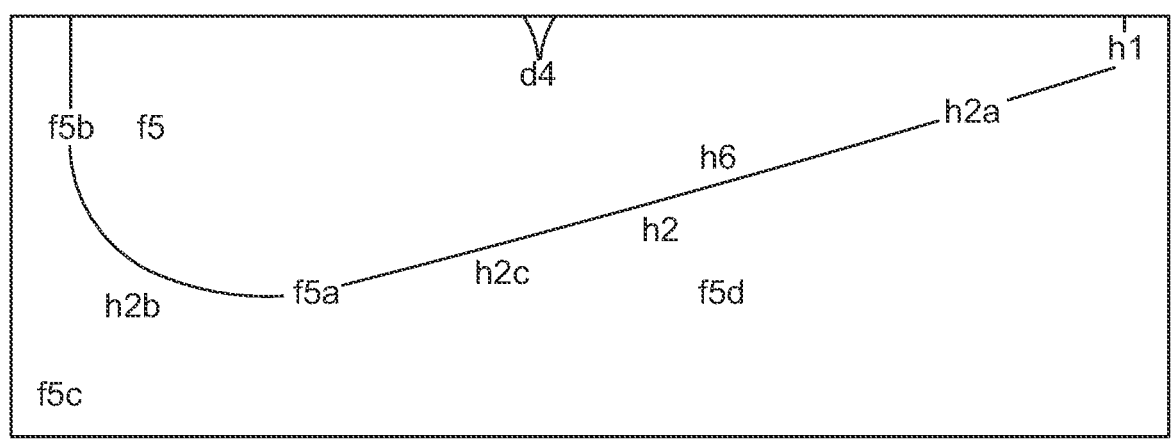
FIG. 20 depicts an example of an adjustment made automatically to the front hem shown in FIG. 19 based on provided responses.

FIG. 14 shows how the suit jacket 1300 shown in FIG. 13 is adjusted for a scenario in which the intended wearer has a narrow waist and large hip. In this case, the suit jacket 1400 and the sloper associated with the suit jacket 1400 is modified in a couple of ways by the apparel patternmaking application 128. For one, instead of only two waist darts 1306 and 1308 being utilized (e.g., as shown in FIG. 13), four waist darts 1402, 1404, 1406, 1408 may be included in a sloper 504 for the suit jacket 1400 shown in FIG. 14 to best fit a wearer having a narrower waist and larger hip measurement. The inclusion of the four waist darts 1402, 1404, 1406, and 1408 may trigger also a code change in the hem 1410 of the suit jacket 1400. In such a scenario, the measurements of the intended wearer having the narrower waist and larger hip size may trigger a scenario that requires a double curve be replaced with a single curve to maintain the seam allowance angles. FIG. 19 shows the example where there is a double curve 1900 and FIG. 20 shows the example where there is a code change and a single curve 2000 for the hem 1410 of the suit jacket 1400. Further, FIG. 21 shows a myriad of examples of code changes to anchor points for the suit jacket 1300 in order to modify the suit jacket 1300 to include two waist darts 1306-1308 or four waist darts 1402-1408 or to modify the hem 1410 of the suit jacket 1400 when the waist of the wearer is narrower than in the case shown in FIG. 13 (e.g. see line 2104 shown in FIG. 21 documenting the code change to the anchor points to correct the angles and create a single curve for the hem 1410 instead of one).

Advantageously, the apparel patternmaking application 128 can provide the computation and calculations for how to adjust the positioning of the anchor points 506 to accommodate the different sets of measurements and body proportions due to the inclusion of the conditional results interface or window 1802, such as that shown in FIG. 18. The conditional results interface or window 1802 shown in FIG. 18 is another example of conditional results or interface that the apparel patternmaking application 128 may present to the user, such as the table 1202 shown in FIG. 12 and conditional results discussed in FIG. 3 and FIG. 9.

As shown in FIG. 18, in the table 1802, the conditional results analysis section may ask questions such as "If A, B, or C is true how should the program adjust?" and allow the user to select Option A, Option B, or create a new design solution or outcome. For the suit jacket 1300 shown in FIG. 13, if it is the case that the front waist dart>1.5 inches, then the outcome may be that a normal single waist dart is not used, but rather two waist darts are used to provide the best shaping and fit. Accordingly, front waist dart>1.5 inches, then one waist dart=False and front waist dart>1.5 inches, then two waist darts=True, would be the example conditional clause entered into and/or defined by default or otherwise selectable in the apparel patternmaking application 128. FIG. 21 includes at line 2102 how two waist darts 1402, 1404 are added to the suit jacket 1300 instead of one waist dart 1306 in order to distribute the amount of fabric.

FIG. 15 shows another example of a suit jacket 1500 modified from its original form shown in FIG. 13. The suit jacket 1500 may be made from using a finalized digital sewing pattern 150 that relates to the modified suit jacket 1500 that is obtainable using the apparel patternmaking application 128. The suit jacket 1500 may be particularly designed for a person of a shorter height or smaller person in comparison with an intended wearer of the suit jacket 1300 shown in FIG. 13. For this reason, the code associated with creating the sloper for the suit jacket 1500 shown in FIG. 15 may be adjusted in many ways, including to provide only two buttons 1502, 1504 on the front 1301 of the suit jacket 1500 rather than the three buttons 1304a, 1304b, and 1304c used for the basic jacket 1300 for a taller person. The height difference may thus be taken into account with a design change that can be selected and tracked in a conditional results table, such as the table 1802 shown in FIG. 18 or table 1202 shown in FIG. 12 in one or more non-limiting embodiments.

Figure 16:
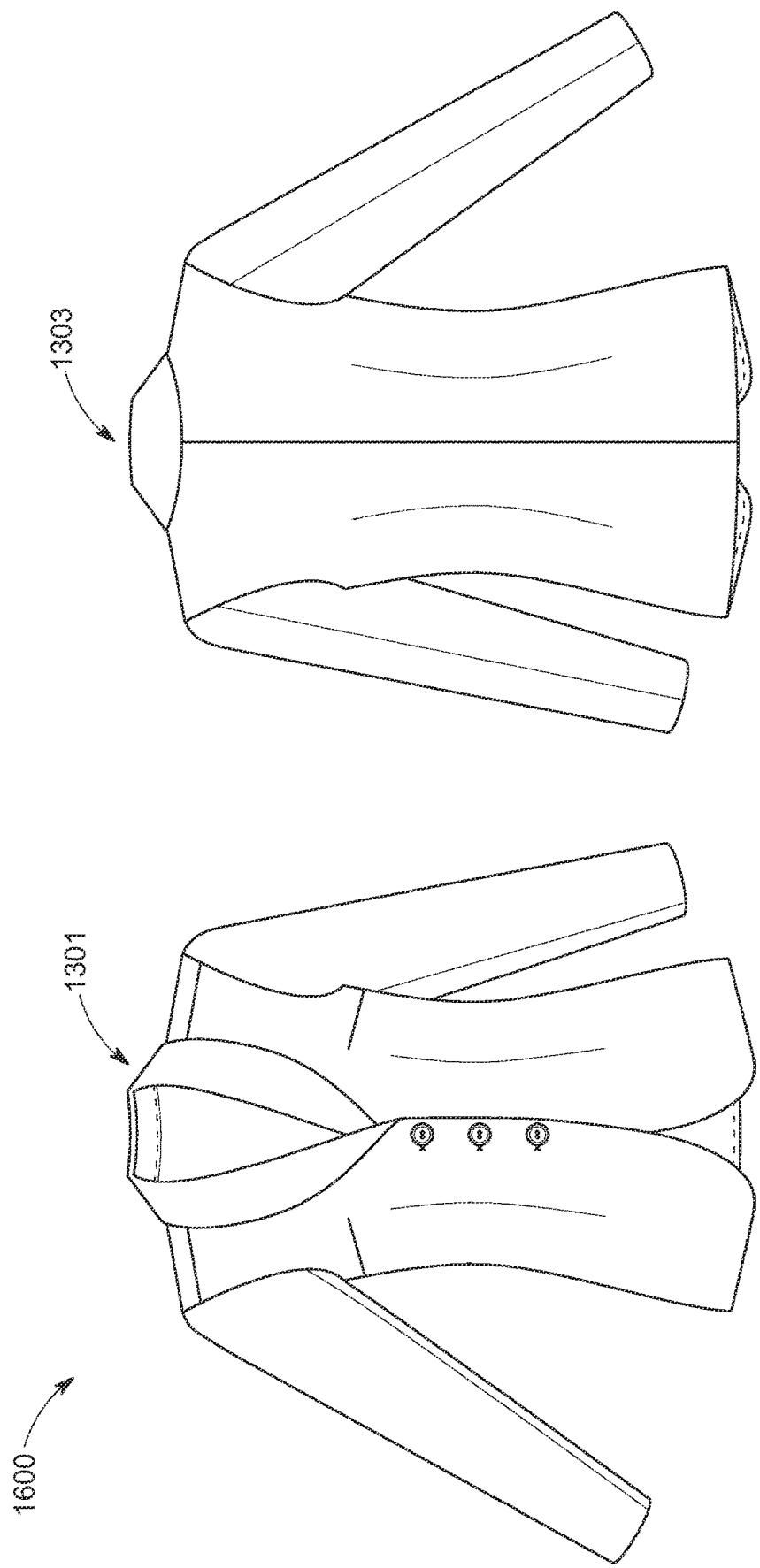
FIG. 16 depicts a pictorial illustration showing adjustments made to the base design shown in FIG. 13 based on a different set of measurements for wider shoulders.

Further, FIG. 16 shows an example in which the basic suit 1300 is modified to accommodate wider shoulders. In which case, the sloper used for the suit jacket 1300 is modified to remove the shoulder darts (e.g., shoulder darts 1310 and 1312 shown in FIG. 13), as the intended wearer of the suit jacket 1600 does not need pinching darts at their shoulders if they have wide shoulders. The apparel patternmaking application 128 may thus take the input provided by the user and/or process the instructions provided in default, pre-defined conditions that state that if the shoulder width measurements provided by the user or another source are wider than a certain value, to then remove the shoulder darts from the sloper and to adjust all anchor points 506, connecting objects, and the seams/hems/folds accordingly.

FIG. 17 shows an example in which the basic suit 1300 is modified to accommodate a scenario in which one person's shoulder is higher on the right than on the left. This may be true where the intended wearer has scoliosis. In such an example, the right shoulder 1702 is higher than the left shoulder 1704 and the sloper for the suit jacket 1700 would be modified accordingly.

FIG. 21 shows how the code changes are changed to accommodate the changes to a suit jacket 1300 and includes the columns 602-628 in accordance with the table 600 shown in FIG. 6 to indicate and list all the labeled anchor points (e.g., anchor points 506) that are plotted based on an X-Y grid (e.g., X-Y grid 2200) and displayed as such on the display canvas 530 of the apparel patternmaking application 128 in one or more objects of a sloper template. The Accordingly, it is notable that many advantages and benefits are provided by the apparel patternmaking application 128 as described above according to one or more non-limiting embodiments.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with; and/or in the context of other particular aspects and embodiments of the invention; and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A computer implemented method for producing a made to measure digital sewing pattern, comprising:
   processing a request to open and create a new file for the made to measure digital sewing pattern in an apparel patternmaking application, wherein the made to measure digital sewing pattern relates to an article of clothing to be worn by an intended wearer;
   receiving a selection for a first sloper, wherein the first sloper is extended and organized into a set of objects, wherein the set of objects can be joined together to form the made to measure digital sewing pattern;
   displaying the first sloper on an editable canvas in the apparel patternmaking application, wherein the first sloper comprises a set of labeled anchor points that are connected by connecting objects, wherein the connecting objects comprise lines, curves, or other geometrical elements that make up the set of objects of the first sloper, wherein the set of labeled anchor points correspond to coordinates plottable on an X-Y grid;

storing a set of measurements relating to a body of the intended wearer of the article of clothing generated from the made to measure digital sewing pattern;

displaying a list of conditional results, wherein the list of conditional results relate to specific design details and changes to be made by the apparel patternmaking application to the first sloper to accommodate unique body proportions of the intended wearer based on an evaluation of the set of measurements and based on selected design changes to be made to the first sloper, wherein the apparel patternmaking application comprises default, pre-defined design details and changes that are adapted to be applied to the first sloper if a condition is triggered, wherein the list of conditional results is displayed as if/then statements having true or false fields, that if a condition is met as true or false, a specific design detail and/or change is applied by the apparel patternmaking application to alter or change an arrangement of one or more labeled anchor points of the set of labeled anchor points and to the connecting objects of the first sloper;

receiving one or more selections for how to implement the specific design detail and/or change for one or more conditions on the list of conditional results, wherein a user is provided with a first option to apply all default pre-defined design details and changes for the list of conditional results, wherein the user is provided with a second option to select different design details and changes other than the default pre-defined design details and changes for the one or more conditions from the list of conditional results, and wherein the user is provided with a third option to provide new additional conditions with new outcomes or changes to be applied to the first sloper;

updating the list of conditional results according to the one or more selections provided by the user;

responsive to updating the list of conditional results according to the one or more selections provided by the user, displaying the first sloper and the set of labeled anchor points in a manner to comply with selected specific outcomes or changes to the first sloper as determined by the list of conditional results, wherein the list of conditional results utilizes the stored set of measurements associated with the intended wearer to modify the first sloper if needed, and wherein the set of labeled anchor points are also tied to the stored set of measurements associated with the intended wearer;

displaying the made to measure digital sewing pattern that is usable to produce the article of clothing for the intended wearer;

receiving a new set of measurements to be applied to the first sloper; and updating the first sloper to reflect any specific design changes based on the new set of measurements, wherein the apparel patternmaking application performs all mathematical calculations to apply the any specific design changes to update the first sloper based on the received one or more selections for the list of conditional results.

2. The computer implemented method of claim 1, further comprising, a machine learning trained module configured to identify errors in the one or more selections provided by the user for the list of conditional results, including to identify errors for provided different outcomes or changes other than the default pre-defined design details and changes for the one or more conditions from the list of conditional results, and the provided new additional conditions with the new outcomes or changes to be applied to the first sloper as provided by the user.

3. The computer implemented method of claim 2, wherein a first set of measurements of the body of the intended wearer are provided as data from a body scanner used to scan the intended wearer.

4. The computer implemented method of claim 2, wherein a first set of measurements of the body of the wearer are provided as data obtained from manually measuring the intended wearer.

5. The computer implemented method of claim 2, wherein a first set of measurements of the body of the wearer combines data obtained from a body scanner and from manually measuring the intended wearer.

6. The computer implemented method of claim 1, wherein the storing of the set of measurements relating to the body of the intended wearer further comprises:
receiving a first set of measurements for the body of the intended wearer;
analyzing the first set of measurements;
determining whether there are empty measurement fields;
if there are empty measurement fields, determining whether values for the empty measurement fields can be calculated;
if the empty measurement fields cannot be calculated, asking for more data to be provided for the empty measurement fields;
if the empty measurement fields can be calculated, calculating the empty measurement fields using built in mathematical equations included in the apparel patternmaking application; and
providing the set of measurements to be stored.

7. The computer implemented method of claim 1, wherein the apparel patternmaking application includes a plurality of templates for slopers relating to one or more articles of clothing and one or more digital sewing patterns.

8. The computer implemented method of claim 7, wherein the plurality of templates for the slopers are editable to create new designs.

9. The computer implemented method of claim 7, further comprising providing cues to prompt the user to provide specific measurements for one or more templates from the plurality of templates.

10. The computer implemented method of claim 1, wherein the made to measure digital sewing pattern is exportable to a digital cutting system.

11. The computer implemented method of claim 1, wherein the made to measure digital sewing pattern is exportable to be printed on paper.

12. The computer implemented method of claim 1, wherein the made to measure digital sewing pattern is exportable as a .dxf file or a .pdf file.

13. The computer implemented method of claim 1, wherein the apparel patternmaking application includes slopers having darts.

14. The computer implemented method of claim 13, wherein the darts comprise shoulder darts, waist darts, and/or bust darts.

15. The computer implemented method of claim 1, wherein the set of labeled anchor points are labeled in alphanumerical order.

16. The computer implemented method of claim 1, further comprising:
  providing an interface displaying a set of anchor points arranged in a framework tree, wherein the framework tree displays a connection between each anchor point of the set of anchor points and how the each anchor point relates back to another anchor point.

17. The computer implemented method of claim 1, further comprising:
  providing an interface displaying a listing of the set of labeled anchor points and a listing of exact X-Y locations on the X-Y grid of each anchor point of the set of labeled anchor points.

18. The computer implemented method of claim 1, wherein the interface further comprises a listing of measurements that the set of labeled anchor points relate to for the calculation of an X location on the X-Y grid and the list of the measurements that the set of labeled anchor points relate to for the calculation of a Y location on the X-Y grid, as well as any measurement actions used to position the set of labeled anchor points as displayed on the first sloper.

19. The computer implemented method of claim 1, further comprising:
  providing an interface displaying a listing of seams and seam allowances included in the first sloper.

20. The computer implemented method of claim 1, further comprising, reusing the first sloper multiple times for different body types or sizes.

* * * * *